(12) United States Patent
Hara et al.

(10) Patent No.: US 7,719,784 B2
(45) Date of Patent: May 18, 2010

(54) DATA STORAGE DEVICE

(75) Inventors: Takeshi Hara, Kawasaki (JP);
Yoshifumi Obara, Higashine (JP);
Shigenori Yanagi, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/175,130

(22) Filed: Jul. 17, 2008

(65) Prior Publication Data

US 2009/0059419 A1    Mar. 5, 2009

(30) Foreign Application Priority Data

Aug. 31, 2007   (JP)   .............................. 2007-227008
Oct. 30, 2007   (JP)   .............................. 2007-282446

(51) Int. Cl.
*G11B 21/02*   (2006.01)
*G11B 5/58*    (2006.01)
*G11B 5/596*   (2006.01)

(52) U.S. Cl. ..................... 360/75; 360/77.01; 360/78.04
(58) Field of Classification Search ........................ None
See application file for complete search history.

(56) References Cited

U.S. PATENT DOCUMENTS 5,311,379 A    5/1994   Shinohara et al.
RE35,302 E  *  7/1996   Hoshimi et al. .......... 360/77.11
6,219,197 B1 * 4/2001   Brown et al. ............. 360/77.08
6,266,205 B1 * 7/2001   Schreck et al. ........... 360/77.06
7,312,946 B2 * 12/2007  Asakura et al. .......... 360/77.06

FOREIGN PATENT DOCUMENTS

| JP | B2 2645182 | 5/1997 |
| JP | 2005-78774 | 3/2005 |
| KR | 10-2004-0017384 | 2/2004 |
| WO | WO 02/091381 | 11/2002 |

* cited by examiner

*Primary Examiner*—K. Wong
(74) *Attorney, Agent, or Firm*—Greer, Burns & Crain, Ltd.

(57) ABSTRACT

According to an aspect of an embodiment, an apparatus, includes: a medium having inner and outer edges and including first and second servo regions extending radially, and containing first and second servo information written thereon, respectively, the first servo region extending outwardly from the inner edge to cover tracks, the first and second servo region having positioned adjacently across a circular boundary; a head for reading out said first servo information and said second servo information; and a processor for executing a process comprising: reading out the first or second servo information; and when controlling the track position across the boundary, adjusting the relation of the first and second servo information across the boundary in control the track position.

14 Claims, 20 Drawing Sheets

1. Inner

2. Center

3. Outer

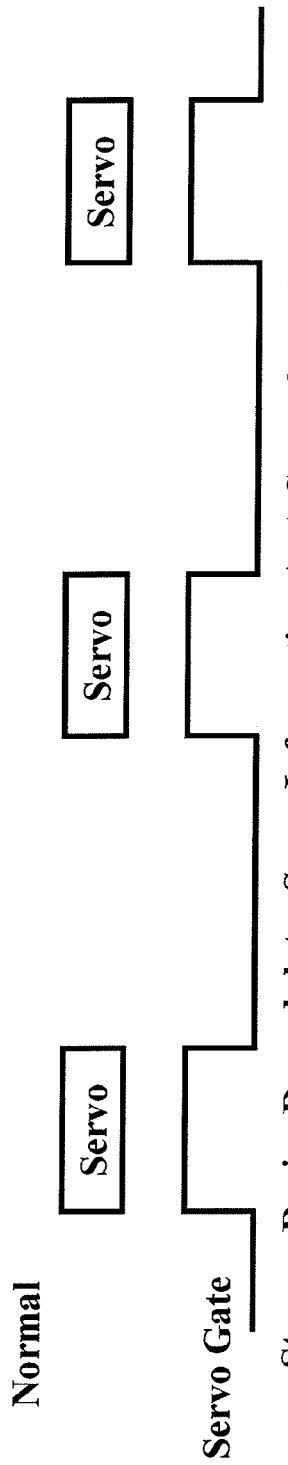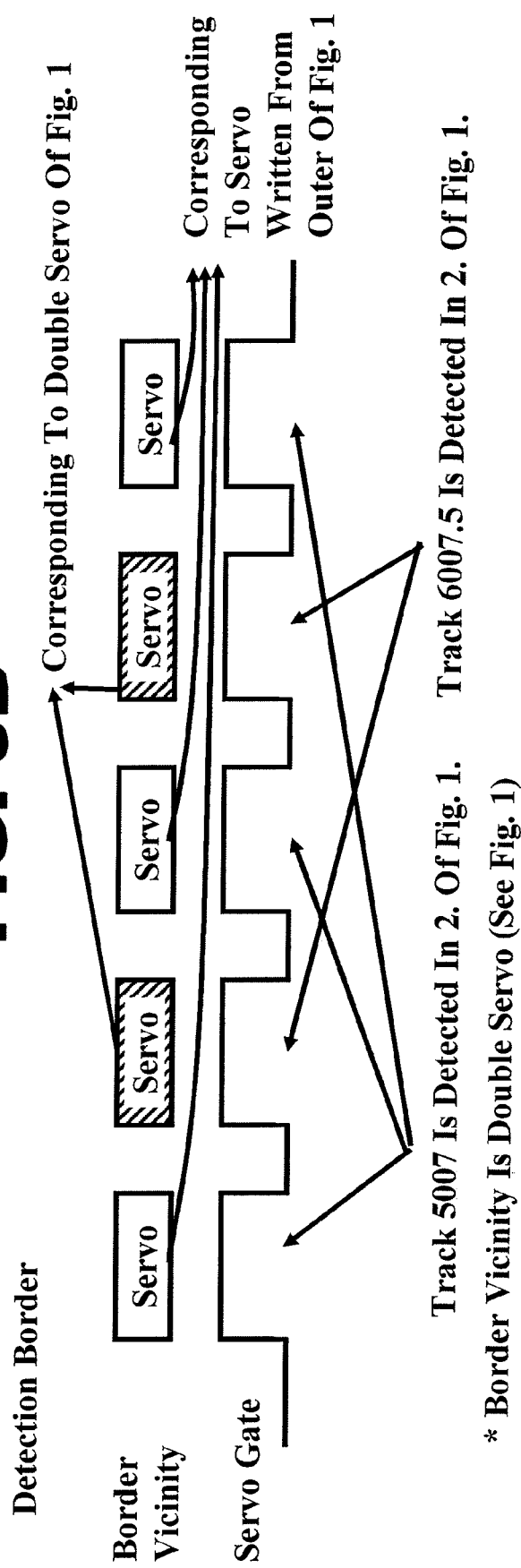

1. Amount Of Relative Eccentricity Is Not Corrected
Seek Across Border (Relative Eccentricity Is Minimum)

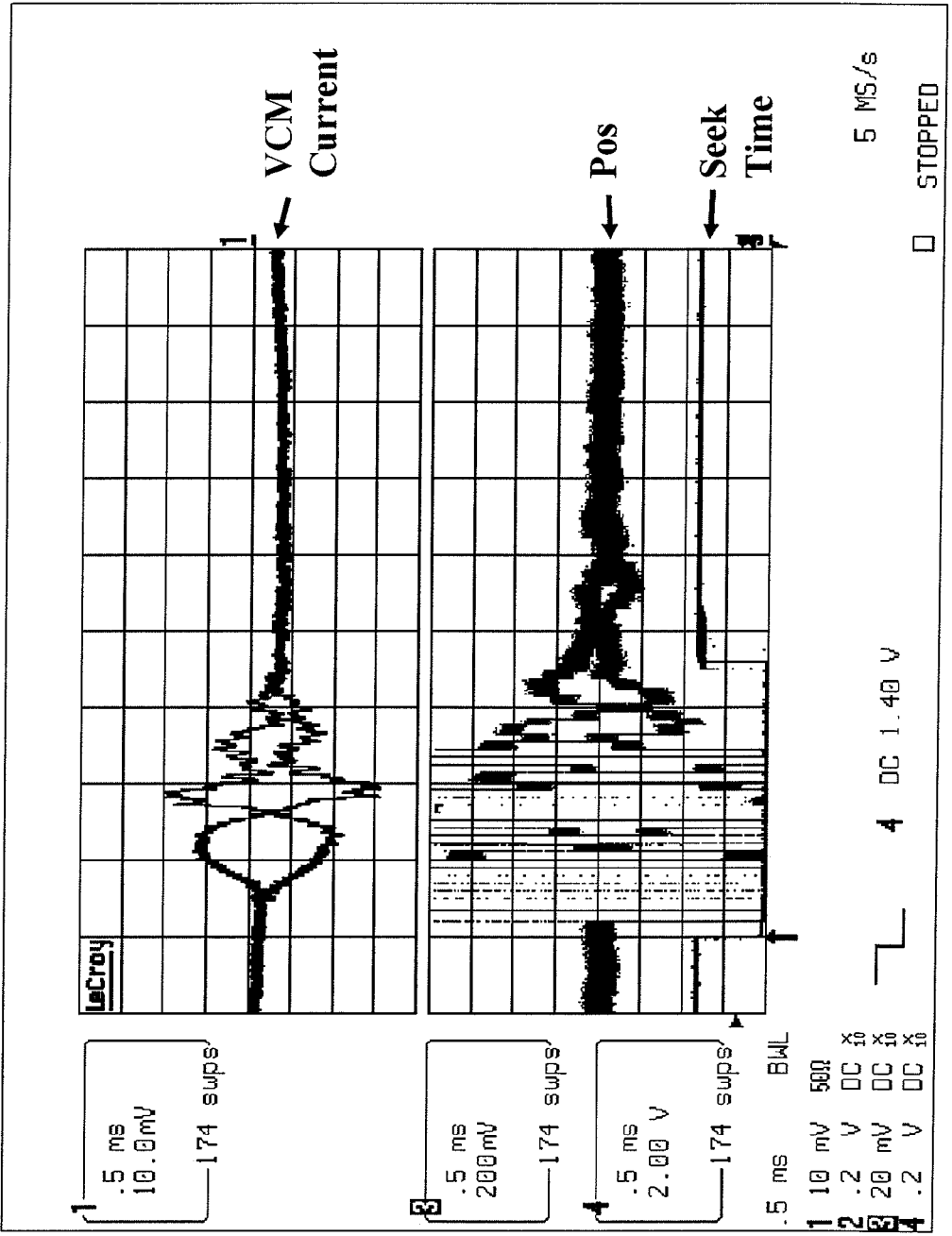

2. Amount Of Relative Eccentricity Is Corrected
Seek Across Border (Relative Eccentricity Is Maximum)

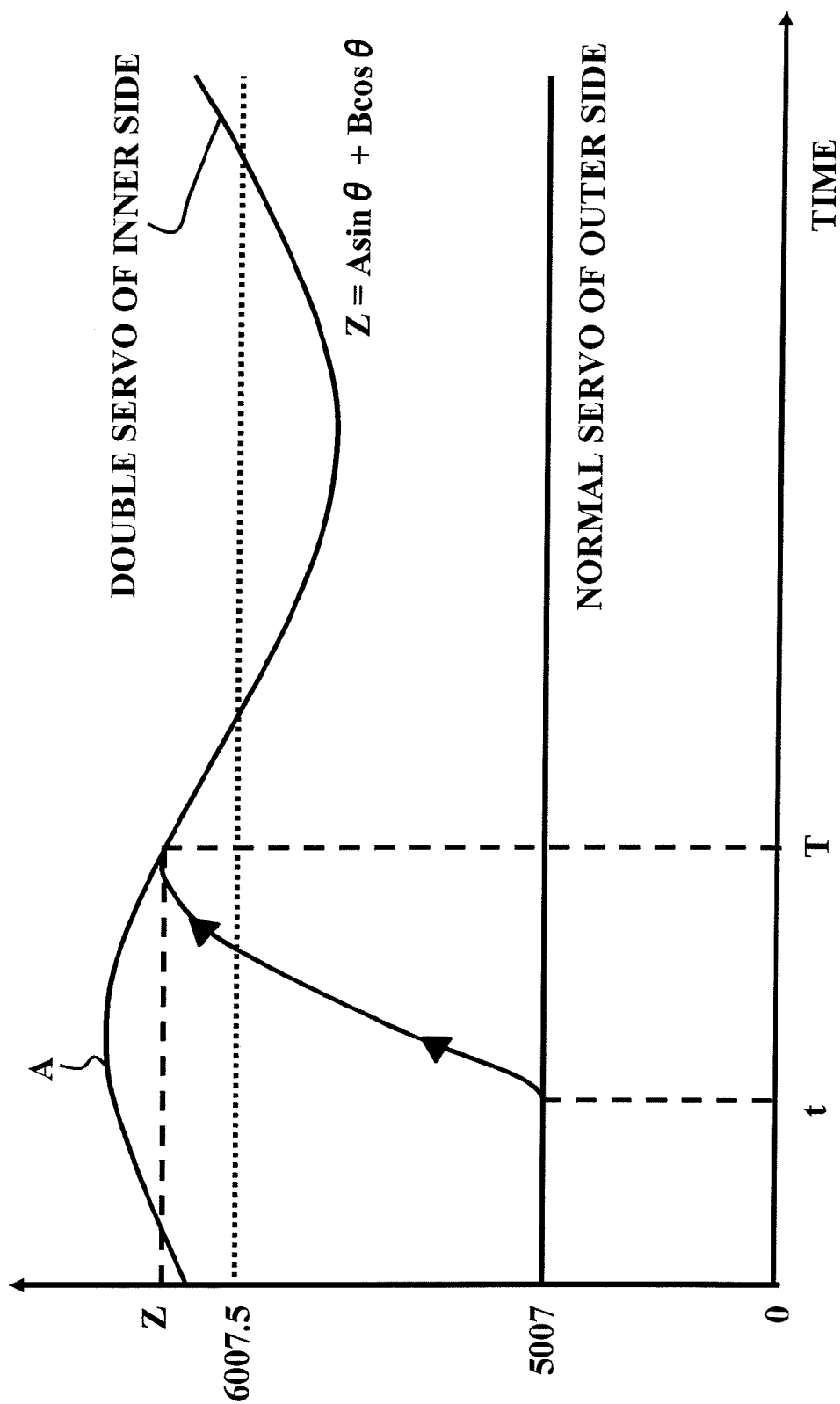

US 7,719,784 B2

DATA STORAGE DEVICE

BACKGROUND OF THE INVENTION

1. Field of the Invention

An aspect of the invention relates to a data storage device.

2. Description of the Related Art

The recoding densities of storage media, such as magnetic disks, magneto-optical disks, and optical disks, are dramatically improving. Consequently, storage devices can be miniaturized and the storage capacities thereof can be increased, which leads to improved convenience of the storage devices.

For such high-density storage media, in order to precisely position a head over a target track, a servo track writer (STW) is used to write servo information, such as a track numbers and a servo pattern (or servo marks) for demodulation of the head position relative to the center of the track. The STW writes the servo information from the outer side or inner side of the storage medium. A control device, such as a storage device, uses the servo information to perform automatic control of the head for writing/reading data to/from the storage medium (refer to Japanese Patent No. 2645182).

The servo information writing using the STW has problems in that erasing called "side fringing" causes deterioration in the quality of servo information written to the storage medium, when the head reads the servo information, for example, servo-mark reading error and gray-code false detection occur.

SUMMARY

According to an aspect of an embodiment, an apparatus, includes: a medium having inner and outer edges and including first and second servo regions extending radially, and containing first and second servo information written thereon, respectively, the first servo region extending outwardly from the inner edge to cover tracks, the first and second servo region having positioned adjacently across a circular boundary; a head for reading out said first servo information and said second servo information; and a processor for executing a process comprising: reading out the first or second servo information; and when controlling the track position across the boundary, adjusting the relation of the first and second servo information across the boundary in control the track position.

BRIEF DESCRIPTION OF THE DRAWINGS

FIG. 5A and FIG. 5B show an example of a scheme for detecting double servo in a border vicinity;

FIG. 13A, FIG. 13B, and FIG. 13C illustrate examples of abnormal current due to overcorrection during seeking;

FIG. 14 is a graph illustrating an overview of a storage device according to a third embodiment;

DESCRIPTION OF THE PREFERRED EMBODIMENTS

A storage device, a servo-information writing method, a seek control method, and a control circuit according to embodiments of the invention will be described below in detail with reference to the accompanying drawings. Main terms used in the embodiments and an overview and features of a storage device according one embodiment, the configuration and a processing flow of the storage device will be described in order and various modifications of the embodiments will be described at the end.

First Embodiment

Description of Terms

[TERMS]

First, main terms used in the embodiments of the invention will be described. The term "storage device" as used herein refers to a device that generally includes a disk for recording data, a head for writing/reading data to/from the disk, a voice coil motor (VCM) for pivoting the arm to seek the head to a predetermined position, and a control circuit for controlling the elements. The storage device has a spindle motor for rotating the disk at a constant rotational speed, and while the head is floating above the rotating disk, the storage device reads/writes data.

The data reading is performed by positioning the head over a predetermined position on the disk and causing the head to read data recorded at the position. The data writing is performed by positioning the head over a predetermined position on the disk and causing the head to write data to the position. Such data positioning is controlled by a processor of the storage device. The processor is a micro control unit (MCU) in the embodiments.

The MCU reads servo-control data, in addition to user data used for processing at a host computer, stored on the disk to control the head position. The servo control data contains on-disk-position information and so on. Thus, when the servo information read by the head is transmitted to the MCU, it calculates the current head position. Next, based on the current head position, the MCU performs filter calculation to obtain a control value. Using the control value, the MCU controls the VCM. As described above, since the VCM is a drive unit for moving the head to a predetermined position, the control of the VCM also causes the positioning of the head to be controlled.

Since the MCU reads the servo information stored on the disk and performs filter calculation to control the head position, as described above, accurately reading the servo information is important for the storage device to control the head position. If the servo information is not correctly written on the disk, servo information read by the MCU also lacks accuracy during the control of the head position. Thus, correctly writing the servo information to the disk is also important.

[Side Fringing]

Figure 1:
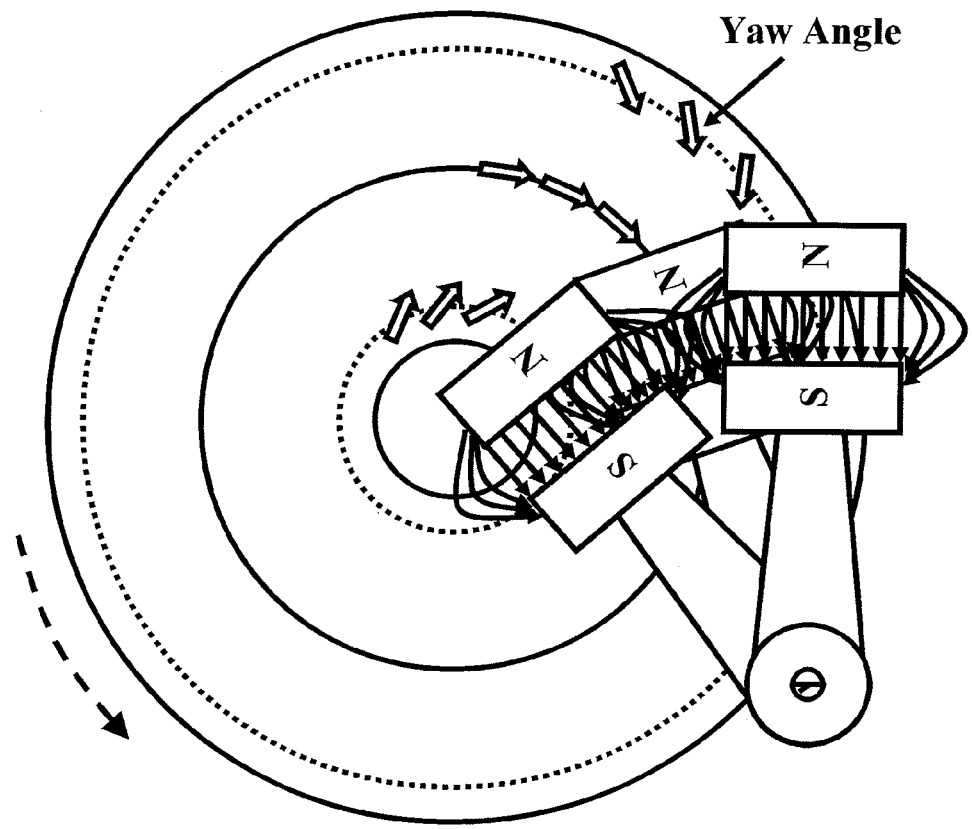
FIG. 1 is a diagram showing a relationship between a yaw angle and the feeding direction of an STW head.
Figure 2A:
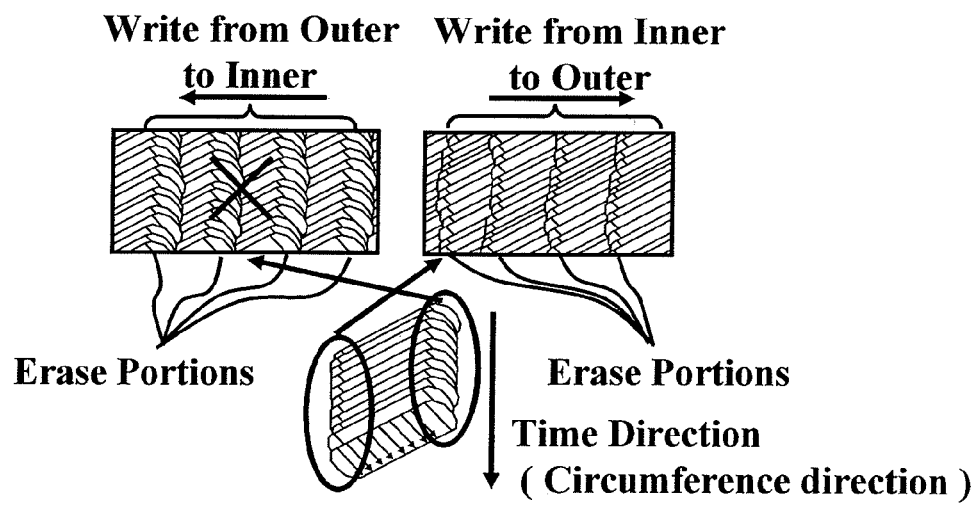
FIG. 2A, FIG. 2B, and FIG. 2C illustrate erase portions in the feeding direction of the STW head.
Figure 2B:
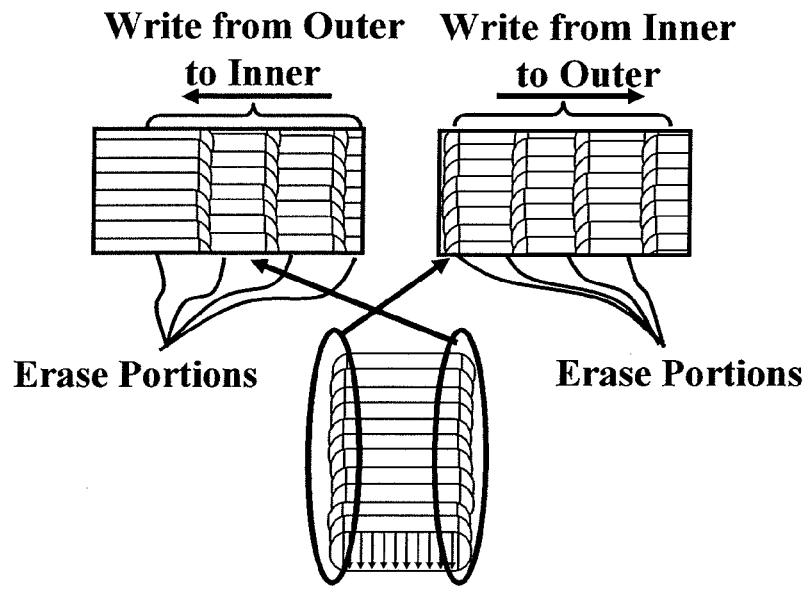
Figure 2C:
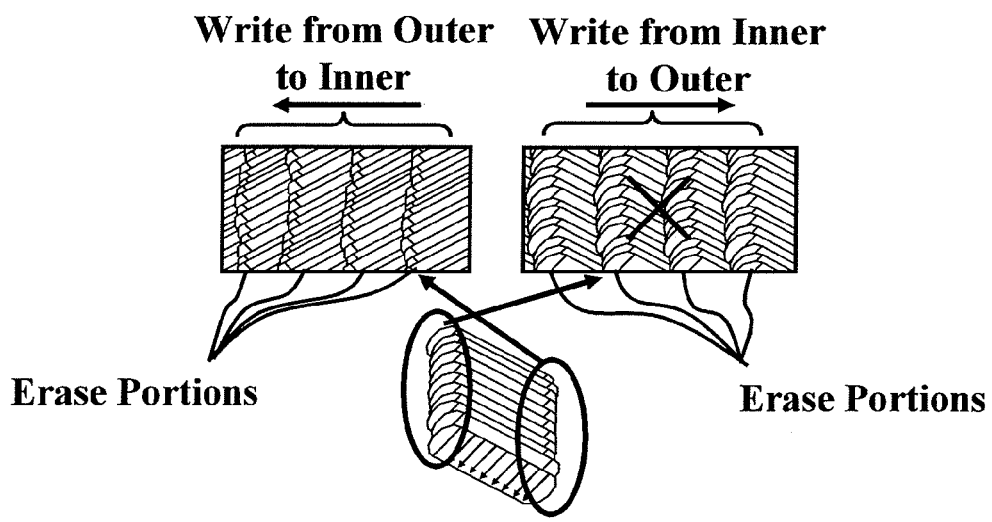

Next, side fringing according to embodiments of the invention will be described below. The servo information writing using the STW has problems in that erasing called "side fringing" causes deterioration in the quality of servo information written to the storage medium, when the head reads the servo information, for example, servo-mark reading error and gray-code false detection occur. The side fringing is caused by a magnetic-field leakage (write spreading) of the write head for writing servo information to the storage medium and is closely associated with the yaw angle of the head and the feeding direction of the STW head, as shown in FIG. 1 More specifically, as shown in FIG. 2A, FIG. 2B, and FIG. 2C, when writing is performed in the outer direction, the effect of side fringing at the outer side increases, and when writing is performed in the inner direction, the effect of side fringing at the inner side increases. Consequently, the size of the erase portions increases to thereby cause a significant deterioration in the quality of the servo information. Under the situation of an increasing number of tracks per inch (TPI: a track density) in recent years, an increase in servo-information error rate and a deterioration in the head positioning, which are caused by the deterioration in the quality of the servo information, are considerable. FIG. 1 shows a relationship between a yaw angle and the feeding direction of the STW head. FIG. 2A, FIG. 2B, and FIG. 2C illustrate erase portions in the feeding direction of the STW head.

Figure 3:
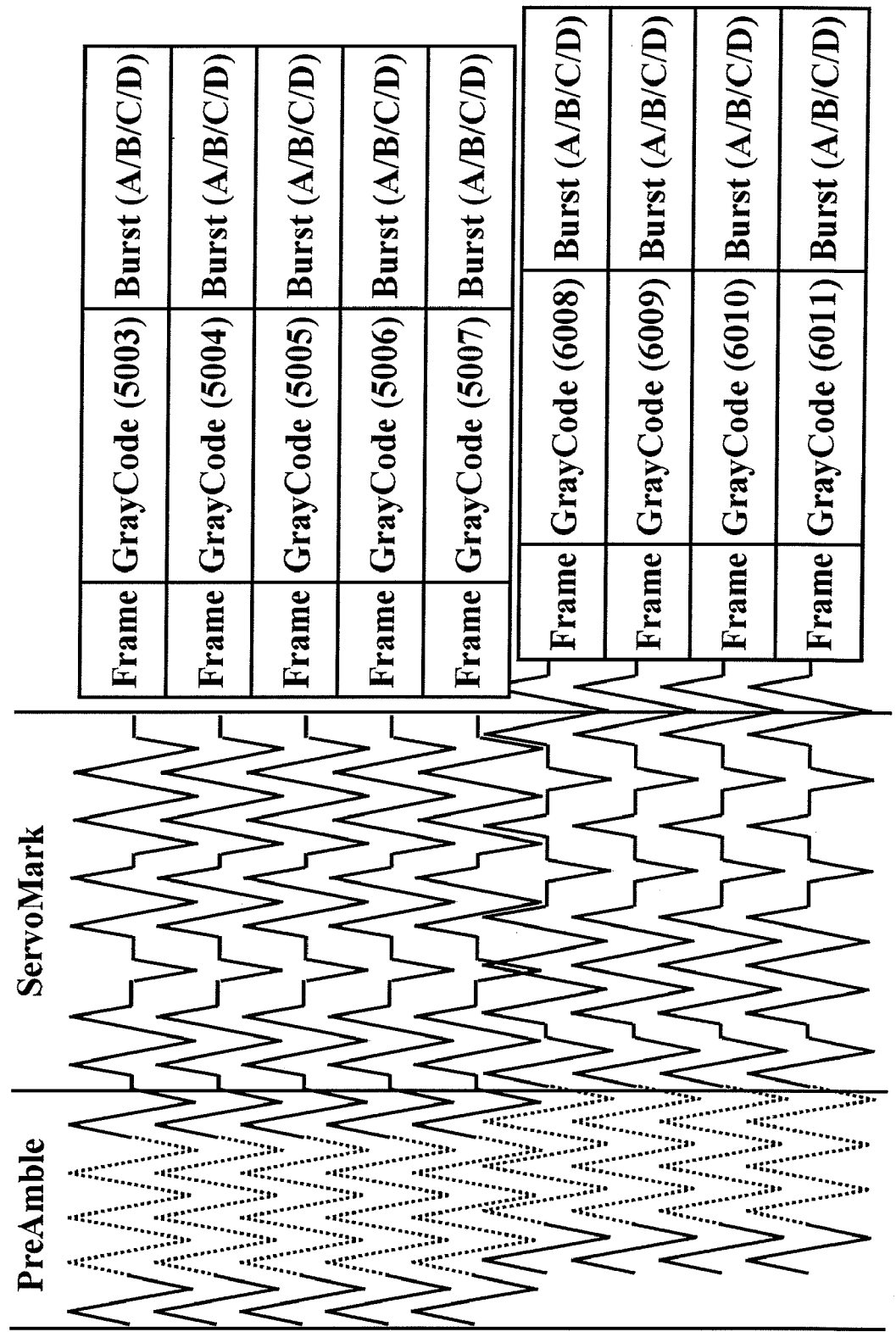
FIG. 3 shows displacement of written servo information in a time direction and a radial direction.

As a scheme for preventing such an increase in servo-information error rate and a deterioration in the head positioning which are caused by the deterioration in the quality of the servo information, a bidirectional servo track writing is employed that writes servo information to the outer side while feeding the STW head toward the inner side and writes servo information to the inner side while feeding the STW head toward the outer side. The use of the bidirectional servo track writing results in the formation of a border between the servo information written from the outer side and the servo information written from the inner side. The border(s) from both sides do not match each other and are displaced in the time direction and the radial direction, due to environmental changes during the writing of the servo information (see FIG. 3), and the displacement is a cause of the occurrence of non-detection or false detection of the servo information. Thus, the use of the bidirectional servo track writing requires correction processing for accurately reading or detecting the servo information written to the border portion (a border cylinder or a cylinder corresponding to the border), and thus, accurately detecting the border portion is important. FIG. 3 illustrates displacement of the written servo information in the time direction and the radial direction.

In the above-described known technology, however, a border cylinder cannot be correctly detected from a storage medium (e.g., hard disk) having only one head. Thus, there is a problem in that an increase in servo-information error rate and deterioration in the head positioning we caused by deterioration in the quality of the servo information. More specifically, border cylinders at two opposite sides of a storage medium are typically different from each other, and thus, inter-head displacement measurement is performed on several zones and the border cylinder is determined through calculation. Thus, for a storage medium having only one disk, a track (or a cylinder) corresponding to the border cannot be determined. This makes it impossible to execute servo-information correction processing for performing processing for accurately reading or detecting the servo information written to the border portion (a border cylinder or a cylinder corresponding to the border), and the deterioration in the quality of the servo information causes an increase in the servo-information error rate and deterioration in the head positioning.

First Embodiment

Figure 4A:
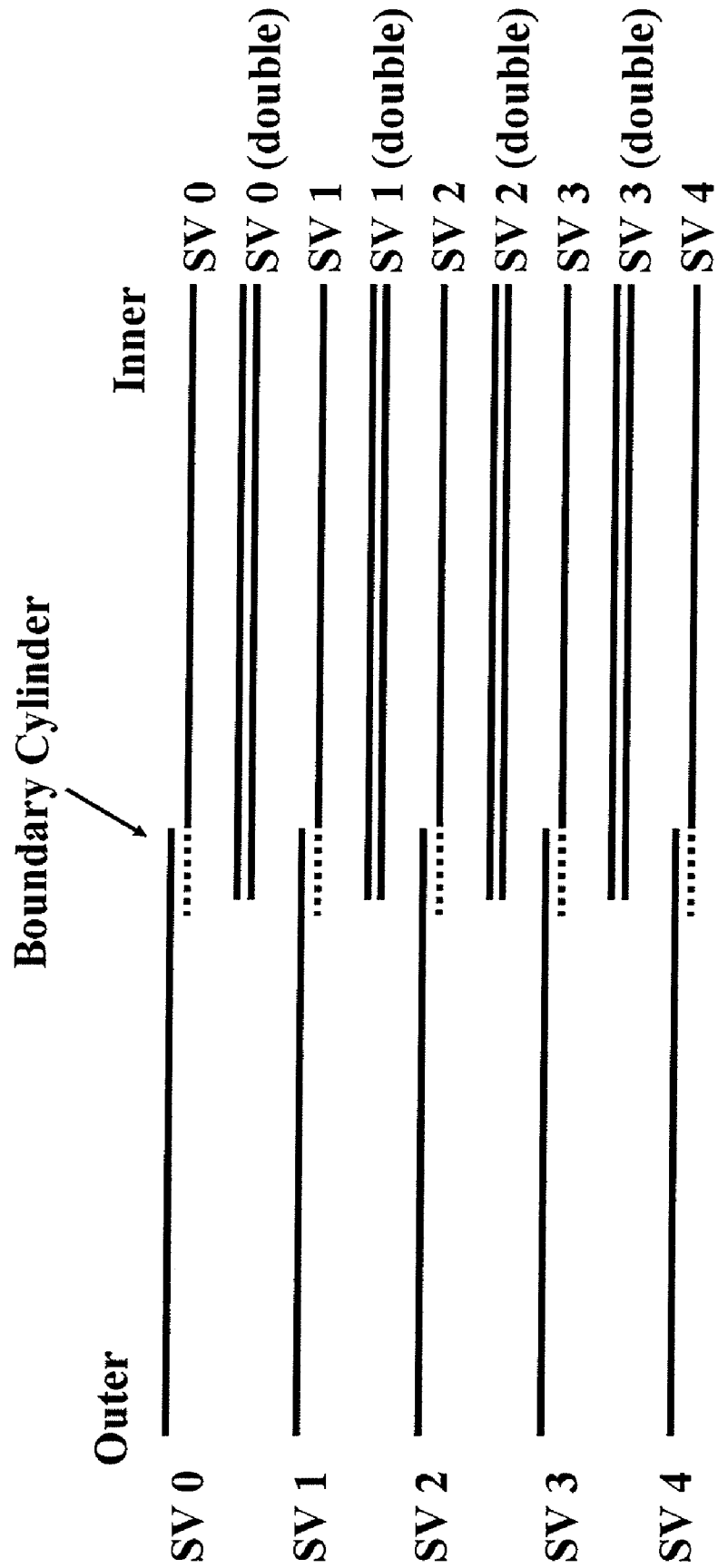
FIG. 4A and FIG. 4B illustrate an overview and features of a storage device according to a first embodiment.
Figure 4B:
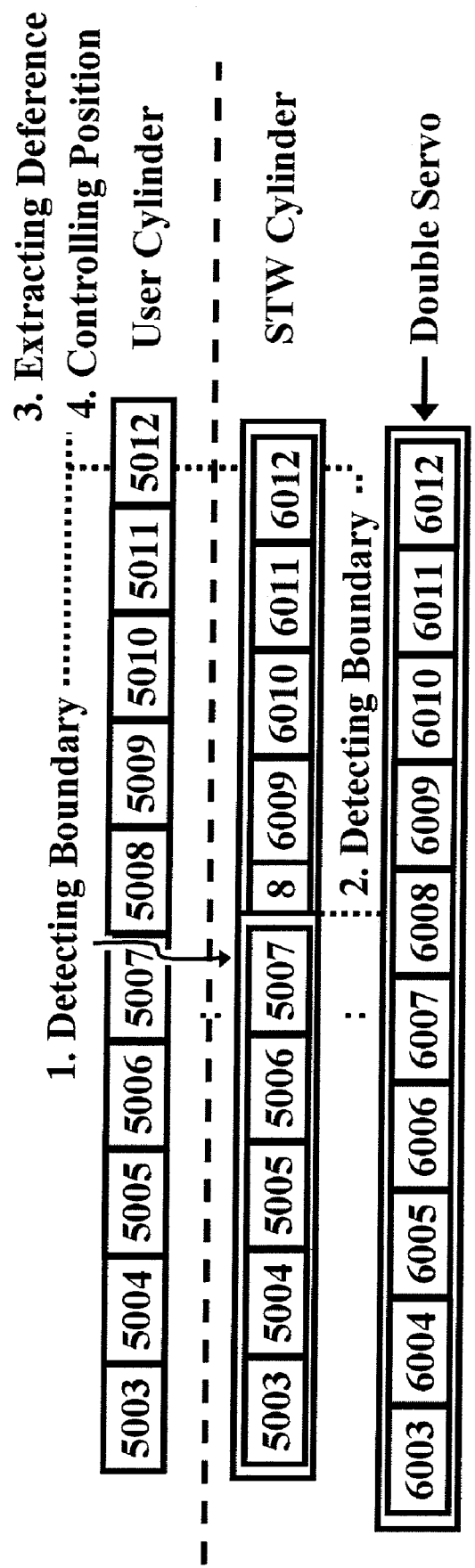

An overview and features of a storage device according to a first embodiment will now be described with reference to the accompanying drawings. FIG. 4A and FIG. 4B illustrate an overview and features of a storage device according to the first embodiment.

An overview of the storage device is to control the position of a head for writing/reading data to/from a storage device having a border between servo information written from the inner side and servo information written from the outer side, through demodulation of the written servo information and obtaining of cylinder information. In particular, the storage device has main features in that, even for a storage medium having only one head, it is possible to correctly detect a border cylinder and to prevent deterioration in the quality of servo information.

The main features will now be described in more detail. The storage device receives a storage medium (see FIG. 4A) that was subjected to first servo writing processing for writing two same pieces of servo information in parallel from an inner cylinder toward a predetermined cylinder at the outer side and then subjected to second servo writing processing for writing servo information from an outer cylinder toward a predetermined cylinder at the inner side so as to overwrite one of the two pieces of servo information written by the first servo writing processing so that the servo information is redundantly written to the predetermined cylinder by the first servo writing processing and the second servo writing processing. In the description of the present embodiment, the track at the innermost cylinder corresponds to "track 10000" in gray code and the track at the outermost cylinder corresponds to "track 1000" in gray code. The predetermined cylinder used herein corresponds to a border between the servo information written by the first servo writing processing and the servo information written by the second servo writing processing.

More specifically, the storage device receives a storage medium to which two same pieces of servo information were written in parallel from the innermost cylinder (the track 10000 in gray code) to a predetermined cylinder (border) and one piece of servo information is written from the outmost cylinder (the track 1000 in gray code) to the border so as to overwrite one of two pieces of servo information written from the innermost cylinder.

For example, the storage device receives a disk to which servo information was written from the gray-code track 10000 to a border (a track 5007) as double servo for writing two same pieces of servo information (SV0·SV0 (double), SV1·SV1 (double), ... ) in parallel and servo information was written from the gray-code track 1000 to the border as normal servo for writing one piece of servo information so as to overwrite (SV0, SV1, SV2, . . . ) written from the innermost cylinder.

That is, the storage device receives a disk to which servo information was written as normal servo from the outermost cylinder (the track 1000) to the border (track 5007.5), servo information is redundantly written (i.e., the servo information written from the outer side and double servo (counterpart) is written from the innermost cylinder) in the vicinity of the border, and servo information is redundantly written from the innermost cylinder (the track 1000) to the border (track 5007.5).

In this case, in this disk 11, the gray-code track 5007 is set as the border between the servo information written from the outermost cylinder and the servo information written from the innermost cylinder. All areas at the inner side do not have to be written by the double servo and only areas in the border vicinity may be written by the double servo.

By using a head to read the servo information written by the second servo information writing processing, the storage device detects cylinder information at the border on the received storage medium (see 1 of FIG. 4B). More specifically, by way of example, the storage medium demodulates the servo information written from the outermost cylinder on the received disk and detects cylinder information (gray code "track 5007") at the border. The gray-code track 5007 is a definite border, since the servo information written from the innermost cylinder is overwritten in the border vicinity. That is, for a user area, the gray-code track 5007 corresponds to the border from the outer side and a gray-code 5008 corresponds to the border from the inner side.

Subsequently, using the head to read the border-cylinder information from the received storage medium, the storage device detects the servo information written by the first servo writing processing and not overwritten by the second servo writing processing (see 2 of FIG. 4B). More specifically, in the above-described example, the storage device demodulates the servo information, written from the innermost cylinder by the double servo and not overwritten by the normal servo, to detect the border-cylinder information (gray code "track 6007.5") on the received storage medium. The detected gray code "track 6007.5" is track information corresponding to the border gray-code track 5007 detected in 1 of FIG. 4B. The cylinder information indicates the same track number in the user area (user cylinder), but does not have the same value due to, for example, disturbance and environmental changes in a servo track writer (STW) for writing the servo information.

A scheme for detecting double servo in the border vicinity will now be described with reference to FIG. 5A and FIG. 5B. FIG. 5A and FIG. 5B show an example of a scheme for detecting double servo in the border vicinity. As shown in FIG. 5A, the storage device reads and demodulates the servo information at a servo gate (SG) interval to control the head. Typically, however, the SG interval is the same as the interval of normal servo (i.e., ordinary servo information, not double servo), and thus, the storage device cannot read the servo information written as double servo. Accordingly, as shown in FIG. 5B, in the border vicinity, the storage device seeks the head to an area by using the servo information written from the outer side, and at the border, the storage device seeks the head by doubling the normal servo gates. With this arrangement, the storage device can read and demodulate not only the servo information (normal servo) written from the outer side but also the servo information (double servo) written from the inner side and not overwritten at the outer side.

The storage device extracts a difference obtained by subtracting the cylinder information detected using the servo information written from the outermost cylinder from the cylinder information detected using the servo information written from the innermost cylinder (see 3 of FIG. 4B). More specifically, in the above-described example, the storage device extracts a difference "1000.5" obtained by subtracting the gray code "track 5007" detected using the servo information written from the outermost cylinder from the gray code "track 6007.5" detected using the servo information written from the innermost cylinder.

Thereafter, when the head is positioned over a track at the inner side of the border at the predetermined cylinder, the storage device uses the head to read servo information obtained by adding the extracted difference to the position of the track, and controls the position of the head by using the read servo information (see 4 of FIG. 4B).

More specifically, in the above-described example, since the servo information is written as sequential numeric values in the user area, track 5008, track 5009, . . . and so on are defined at the inner side of the detected border track 5007. Since the servo information written from the outer side is not written subsequent to the track 5007, it is necessary to demodulate the servo information written from the inner side and control position of the head. However, as determined in 3 of FIG. 4B, the servo information written at the inner side and the servo information written at the outer side have a difference of 1000.5. Thus, for example, when the head is positioned over the track 5008, it is necessary to demodulate the servo information "track 6008.5" written from the inner side. That is, when the head is positioned over a track at the inner side of the border track 5007, the storage device reads and demodulates servo information obtained by adding the difference "1000.5" to the servo information in the user area to control the position of the head.

Thus, even for a storage medium to which servo information was written from both the outer side and the inner side by bidirectional servo track writing, the storage device according to the first embodiment corrects the servo information by an amount corresponding to the difference between the servo information at the outer side and the servo information at the inner side to detect accurate servo information. As a result, as in the above-described main features, the storage device can correctly detect a border cylinder from even a storage medium having only one head and also can prevent deterioration in the quality of the servo information.

Configuration of Storage Device

Figure 6:
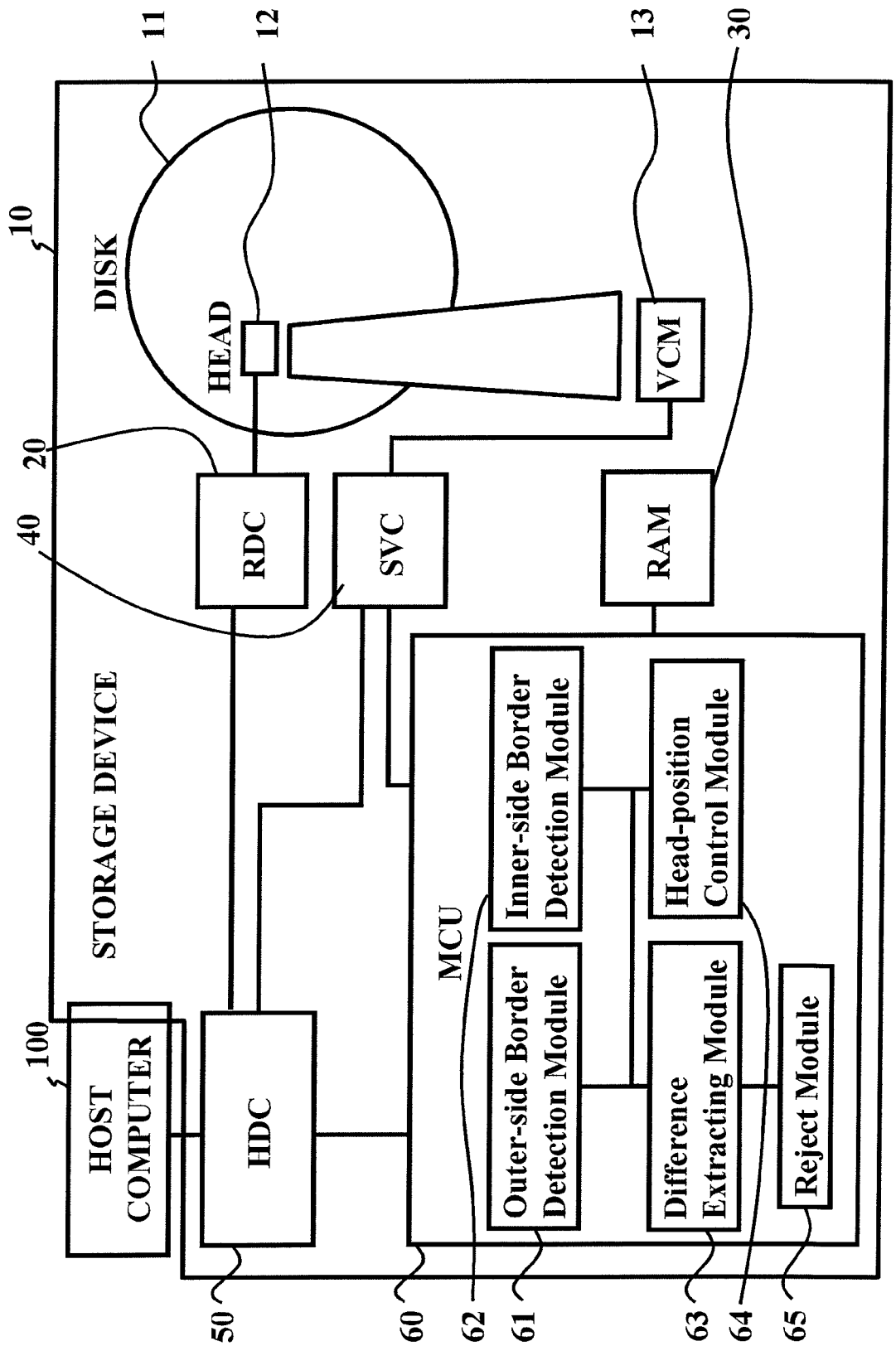
FIG. 6 is a block diagram showing the configuration of a storage device according to a first embodiment.

The configuration of the storage device shown in FIG. 4A and FIG. 4B will now be described with reference to FIG. 6. FIG. 6 is a block diagram showing the configuration of the storage device according to the first embodiment. As shown in FIG. 6, this storage device 10 includes a disk 11, a head 12, a voice control motor (VCM) 13, a read/write channel (RDC) 20, a random access memory (RAM) 30, a servo controller (SVC) 40, a hard disk controller (HDC) 50, and a micro control unit (MCU) 60.

The disk 11 stores servo information and user data. The servo data is written to the disk 11 by being subjected to first servo writing processing for writing two same pieces of servo information in parallel from an inner cylinder toward a predetermined cylinder at the outer side and then to second servo writing processing for writing servo information from an outermost cylinder to a predetermined cylinder at the inner side so as to overwrite one of the two pieces of servo information written by the first servo writing processing. In the description of the present embodiment, the innermost cylinder corresponds to "track 10000" in gray code and the outermost cylinder corresponds to "track 1000" in gray code.

More specifically, the disk 11 is a medium fabricated by forming a magnetic layer on a disk-shaped plate made of metal or glass, and magnetically records the user data and the servo information. In the storage medium 11, two same pieces of servo information are written in parallel from the innermost cylinder (gray-code track 10000) to a predetermined cylinder border (gray-code track 5007) and one piece of servo information is written from the outermost cylinder (gray-code track 10000) to the border so as to overwrite one of the two pieces of servo information written from the innermost cylinder.

Figure 7:
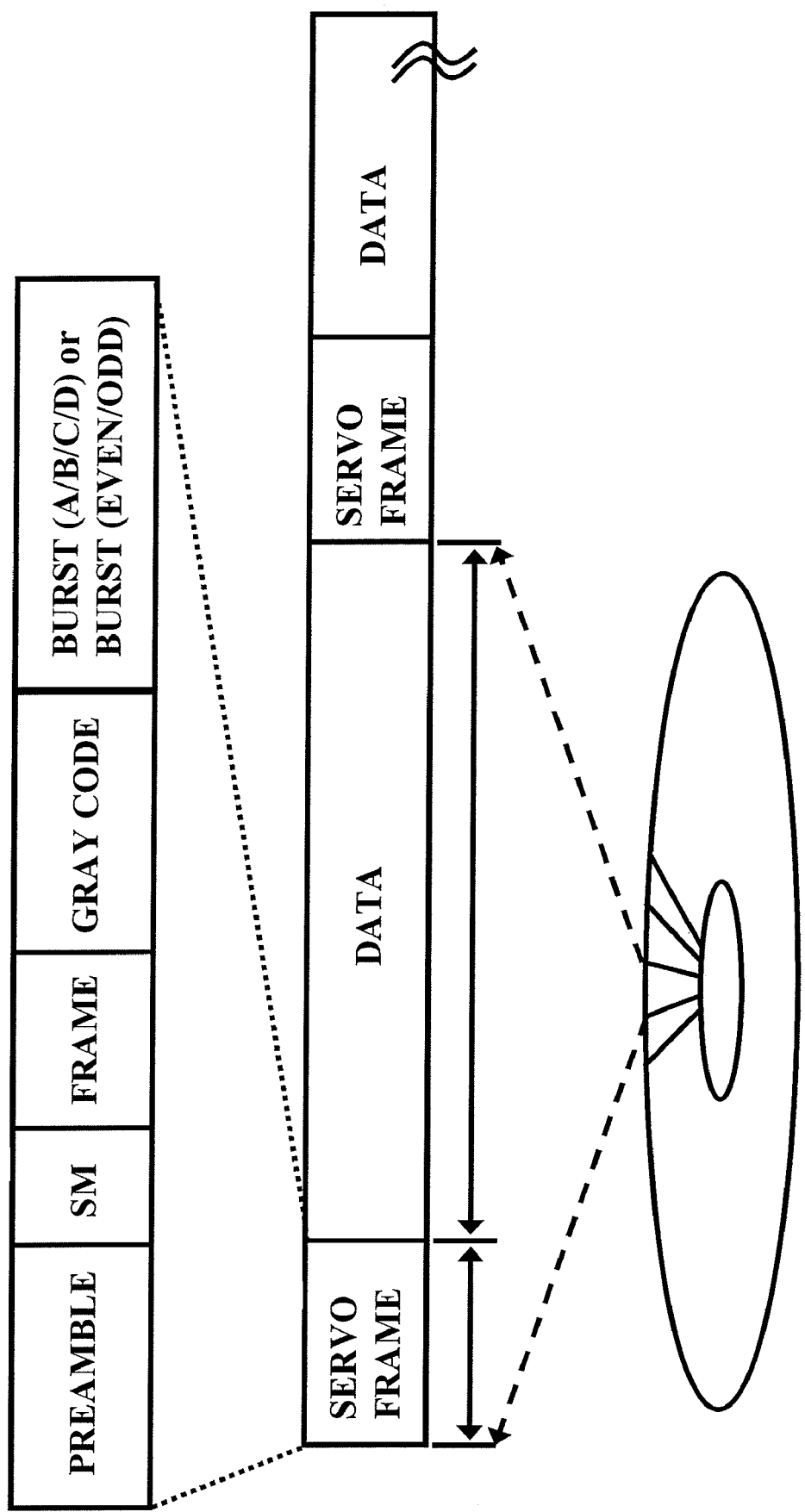
FIG. 7 shows the configuration of the storage device according to the first embodiment.

FIG. 7 shows an example of the servo information to be written. As shown in FIG. 7, the disk 11 stores servo frames including preamble, synchronization mark (SM), frame, gray code, and burst information. Herein, the term "user data" refers to data used for processing performed by a host computer 100, and the term "servo information" refers to data used for controlling positioning of the head 12. The head 12 reads data (user data and servo information) recorded on the disk 11 and writes data (user data) thereto. In this case, a gray-code track 5007 is provided on the disk 11 as between border between the servo information written from the track at the outermost cylinder by the first servo writing processing and the servo information written from the track at the innermost cylinder by the second servo writing processing. That is, one piece of servo information is written from the outermost cylinder of the disk 11 to the border track 5007 (gray code) and two same pieces of servo information are written in parallel from the innermost cylinder.

The head 12 writes/reads data to/from the disk 11 and reads servo information stored thereon. Specifically, the head 12 has an element for converting magnetism into electrical signals, and reads/writes data and reads servo information while floating above the rotating disk 11. For example, the head 12 reads user data and servo information magnetically recorded on the disk 11 and sends data converted into electrical signals to the RDC 20 via a head amplifier (not shown).

In order for the head 12 to perform user-data reading/writing at a predetermined position over the disk 11, control for positioning the head 12 needs to be performed so that the head 12 is positioned at the predetermined position over the disk 11. Such control for positioning the head 12 is accomplished by the VCM 13, the SVC 40, and MCU 60.

The VCM 13 performs the control for positioning the head 12. Specifically, the VCM 13 is implemented by a motor for operating a disk drive unit for moving the head 12. By rotating the motor, the VCM 13 performs the control for positioning the head 12. The VCM 13 is connected to the SVC 40 and is controlled by the MCU 60.

The RDC 20 demodulates code of user data and servo information read from the disk 11 and also modulates code of user data to be written to the disk 11. Specifically, the RDC 20 includes a modulation circuit for writing user data to the disk 11 and a demodulation circuit for retrieving on-disk position information from servo information.

The RAM 30 is connected to the MCU 60 and temporarily stores data, such as read servo information.

The SVC 40 mainly drives and controls a spindle motor (SPM; not shown) and the VCM 30. Specifically, the SVC 40 includes a power circuit for driving a spindle motor for rotating the disk 11 and a power circuit for driving the VCM 13 for controlling the positing of the head 12. The SVC 40 is connected to the spindle motor, the VCM 13, the HDC 50, and the MCU 60. For example, the SVC 40 receives an input of a control value indicating head-position control information from the MCU 60, and controls the VCM 13 based on the control value.

The HDC 50 controls interface between the host computer 100 and the storage device 10 and controls interface with each functional unit. Specifically, the HDC 50 includes, for example, an error correction circuit for correcting error in data transferred between the host computer 100 and the storage device 10 and an interface control circuit for controlling interface between the host computer 100 and the storage device 10 and interface between the RDC 20 and the MCU 60. The HDC 50 is connected to the host computer 100, the RDC 20, the SVC 40, and the MCU 60.

For example, upon receiving a data read/write instruction from the host computer 100, the HDC 50 sends the instruction to the RDC 20 to write data to the disk 11 or transmits data to the host computer 100. Also, for example, upon receiving electrical current, supplied to the head 12 for its position control, from the RDC 20, the HDC 50 outputs the electrical current to the MCU 60.

The MCU 60 has an internal memory for storing required data and a program that specifies various processing procedures, and mainly controls the entire storage device 10 and the positioning of the head 12. In particular, according to the invention, the MCU 60 includes an outer-side border detection module 61, an inner-side border detection module 62, a difference extracting module 63, a head-position control module 64, and a reject module 65. The outer-side border detection module 61, the inner-side border detection module 62, the difference extracting module 63, the head-position control module 64, and the reject module 65 do not necessarily have to be included in one MCU, and may be separately provided in multiple circuits.

By using the head 12 to read servo information written by the second servo information processing, the outer-side border detection module 61 detects track information at the border on the received disk 11. More specifically, by way of example, two parallel pieces of servo information (double servo) are written from the innermost cylinder of the disk 11 to the border track 5007 (gray code) and one piece of servo information (normal servo) is written from the outermost cylinder to the track 5007 so as to overwrite one of the two pieces of double servo.

The outer-side border detection module 61 outputs, to the SVC 40, an instruction for controlling the head 12 to moves it to a predetermined cylinder at the border. In accordance with the instruction, the SVC 40 drives the VCM 13 to position the head 12 over a track at the border cylinder. Subsequently, the head 12 reads the servo information written to the track by the second servo writing processing and outputs the read servo information to the RDC 20. The RDC 20 demodulates the input servo information and outputs the demodulated information to the outer-side border detection module 61 via the HDC 50. Thereafter, the outer-side border detection module 61 detects border-cylinder information (gray code "track 5007") from the demodulated and input information and outputs the extracted gray code "track 5007" to the difference extracting module 63. The border track 5007 (gray code) is a definite border, since the servo information written from the inner cylinder is overwritten in the border vicinity.

By using the head 12 to read the servo information written by the first servo writing processing and not overwritten by the second servo writing processing, the inner-side border detection module 62 detects the servo information cylinder information at the border on the received disk 11. More specifically, in the above-described example, similarly to the scheme described for the outer-side border detection module

61, the inner-side border detection module 62 sends an instruction for head-position control to the SVC 40, and then receives the servo information, read by the head 12, via the RDC 20 and the HDC 50.

The inner-side border detection module 62 then demodulates the servo information (such as SV0 (double)) written as double servo by the first servo writing processing from the innermost cylinder of the disk 11 and not overwritten by the normal servo written by the second servo writing processing from the outermost cylinder, to detect the border-cylinder information (gray code "track 6007.5"). The inner-side border detection module 62 then outputs the detected gray code "track 6007.5" to the difference extracting module 63. The detected gray code "track 6007.5" is cylinder information corresponding to the border track 5007 detected by the outer-side border detection module 61. The cylinder information indicates the same track number in the user area (user cylinder), but does not have the same value due to, for example, disturbance and environmental changes in the servo track writer (STW) for writing the servo information.

The difference extracting module 63 extracts a difference obtained by subtracting the cylinder information detected by the outer-side border detection module 61 from the cylinder information detected by the inner-side border detection module 62. More specifically, in the above-described example, the difference extracting module 63 extracts a difference "1000.5" obtained by subtracting the gray code "track 5007" input from the outer-side border detection module 61 from the gray code "track 6007.5" input from the inner-side border detection module 62, and outputs the extracted difference to the head-position control module 64. When the difference obtained by subtracting the cylinder information detected by the outer-side border detection module 61 from the cylinder information detected by the inner-side border detection module 62 is a negative value, the difference extracting module 63 issues a notification indicating that the difference is a negative value to the reject module 65.

When the head 12 is positioned over a track at the inner side of the border, the head-position control module 64 uses the head 12 to read servo information obtained by adding the difference extracted by the difference extracting module 63 to the position of the track, and controls the position of the head 12 by using the read servo information.

More specifically, in the above-described example, at the outer side of the border track 5007, only the servo information written from the outermost cylinder (the track 1000 in gray code) exists and sequential servo information is written from the outermost cylinder to the border track 5007. Thus, when the head 12 is positioned over a track at the outer side of the border track 5007, the head-position control module 64 controls the position of the head 12 by controlling/driving the SVC 40 and the VCM 13, based on the information resulting from the demodulation of the servo information written from the outermost cylinder.

On the other hand, at the inner side of the border track 5007, only the servo information written from the innermost cylinder (the gray-code track 10000) exists, and the servo information written from the border track 5007 to the innermost cylinder do not have sequential numeric values, since the servo information written at the inner side and the servo information written at the outer side have a difference of 1000.5. For example, servo information corresponding to track 5010 in the user area is track 6010.5. That is, when the head 12 is positioned over the track 5010 in the user area, servo information to be read is track 6010.5, not track 5010. Thus, when the head is positioned over a track at the inner side of the border track 5007, the head-position control module 64 controls the position of the head 12 by reading/demodulating servo information (gray code "track 6007.5") obtained by adding the difference "1000.5" extracted by the difference extracting module 63 to the servo information in the user area.

When the difference extracted by the difference extracting module 63 is a negative value, the reject module 65 outputs, to the host computer 100, a manufacture facility, and/or the like, a notification indicating that the storage medium has track information from which a negative value was detected. Then, the storage medium may be rejected and may be prevented from being used. When the storage device has a medium ejecting function, it may eject the storage medium and may output a notification.

More specifically, when the difference obtained by extracting the track information detected by the outer-side border detection module 61 from the track information detected by the inner-side border detection module 62 is a negative value, a cylinder having double gray codes exists. In the above-described example, when the difference obtained by subtracting a gray code input from the outer-side border detection module 61 from a gray code input from the inner-side border detection module 62 is −1000, the gray codes of the border track 5007 to the track 4007 exist at both the outer side and the inner side of the border. Thus, when a track located between the track "5007" and the track "4007" is to be searched for, the searching cannot be correctly performed since the same gray codes exist at both the outer side and the inner side. Accordingly, when the difference extracted by the difference extracting module 63 is a negative value, the reject module 65 rejects the storage medium having track information from which the negative value was detected.

Processing of Storage Device

Figure 8:
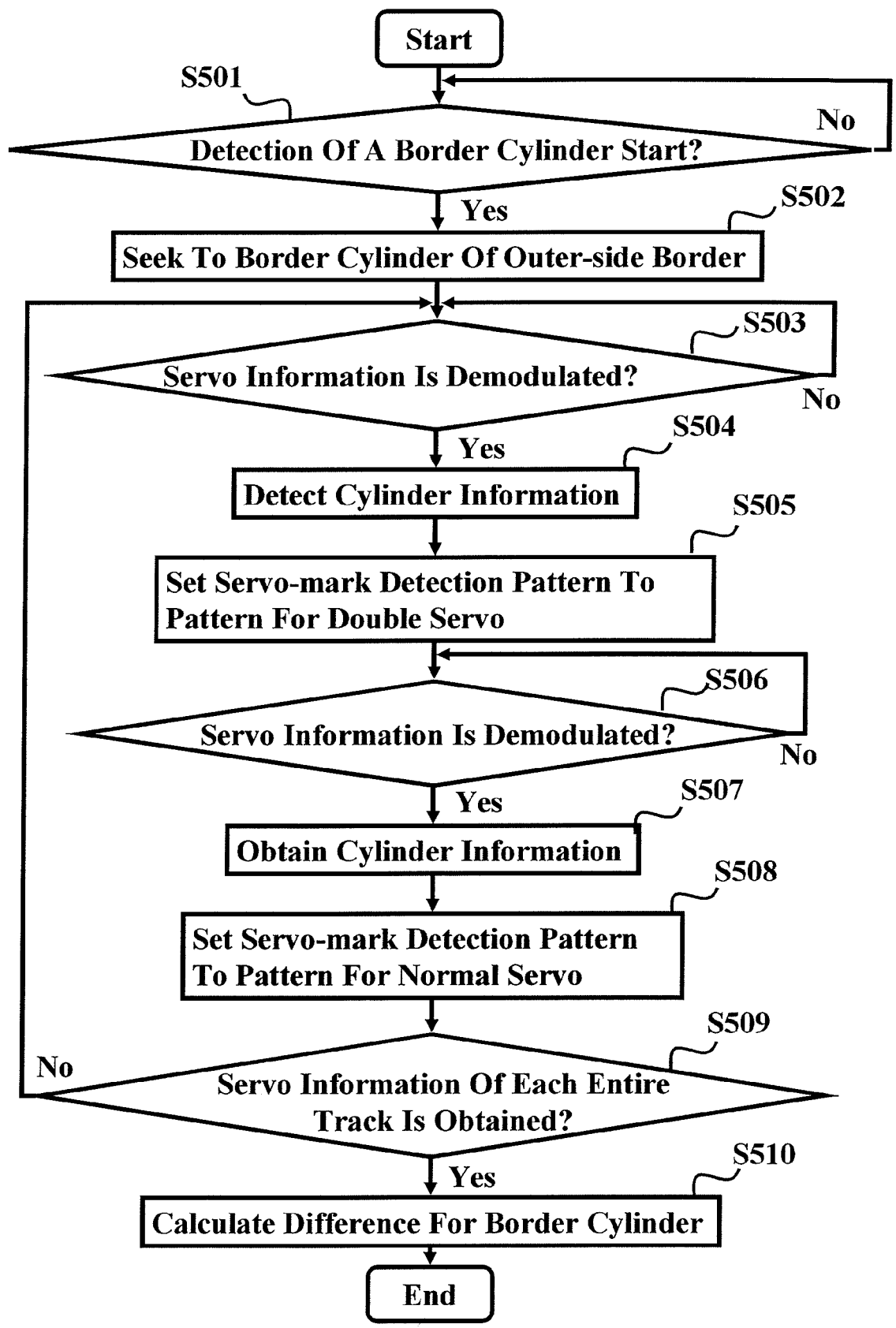
FIG. 8 is a flowchart showing border detection processing performed by the storage device according to the first embodiment.

Border detection processing performed by the storage device will now be described with reference to FIG. 8. FIG. 8 is a flowchart showing border detection processing performed by the storage medium according to the first embodiment.

Flow of Border Detection Processing

As shown in FIG. 8, when an instruction for starting detection of a border cylinder is input from the host computer 100 or the like (affirmative in S501), the storage device 10 seeks the head 12 to a border cylinder corresponding to the outer-side border (in step S502).

More specifically, for example, when an instruction for starting detection of a border cylinder is input from the host computer 100 or the like, the MCU 60 in the storage device 10 drives the SVC 40 and the VCM 13 to seek the head 12 to a border cylinder corresponding to the outer-side border. In this case, information for the outer-side border is preset in the MCU 60 by an administrator or the like. Thus, when the storage device 10 receives the storage medium and receives the border-cylinder detection start instruction, the MCU 60 can seek the head 12 to the border cylinder.

When the servo information at the border cylinder is read by the head 12 and is completely demodulated (affirmative in step S503), the storage device 10 detects cylinder information from the read and demodulated servo information (in step S504).

More specifically, for example, when the head 12 is sought to the border cylinder and is positioned over a track, it reads servo information on the track and outputs the read servo information to the RDC 20. The RDC 20 demodulates the input servo information and outputs the demodulated servo information to the MCU 60 via the HDC 50. When the MCU 60 receives the servo information, the outer-side border detection module 61 detects the cylinder information (gray code "track 5007") from the received servo information and outputs the detected cylinder information to the difference extracting module 63.

Subsequently, the storage device 10 sets a servo-mark detection pattern to a pattern for double servo and seeks the head 12 to a border cylinder corresponding to the inner-side border (in step S505). When servo information at the border cylinder is read by the head 12 and is completely demodulated (affirmative in step S506), the storage device 10 detects (obtains) cylinder information from the read and demodulated servo information (in step S507).

More specifically, for example, when the servo-mark detection pattern is set for double servo and the head 12 is moved to the border cylinder corresponding to the inner-side border and is positioned over a track, the head 12 reads servo information on the track and outputs the read servo information to the RDC 20. The RDC 20 demodulates the input servo information and outputs the demodulated servo information to the MCU 60 via the HDC 50. When the MCU 60 receives the servo information, the inner-side border detection module 62 detects cylinder information (gray code "track 6005.5") from the received servo information and outputs the detected cylinder information to the difference extracting module 63.

Thereafter, the servo-mark detection pattern is set to a pattern for normal servo (in step S508). Upon obtaining servo information of each entire track (affirmative in step S509), the storage device 10 calculates a difference for the border cylinder (in step S510).

More specifically, for example, when the servo-mark detection pattern is set for a pattern for normal servo and servo information of each entire track is obtained, the difference extracting module 63 in the storage device 10 extracts a difference "1000.5", obtained by subtracting the border-cylinder information (gray code "track 5007") received from the outer-side border detection module 61 from the border-cylinder information (gray code "track 6007.5") received from the inner-side border detection module 62. The difference extracting module 63 then outputs the extracted difference to the head-position control module 64.

Flow of Head-Position Control Processing

Figure 9:
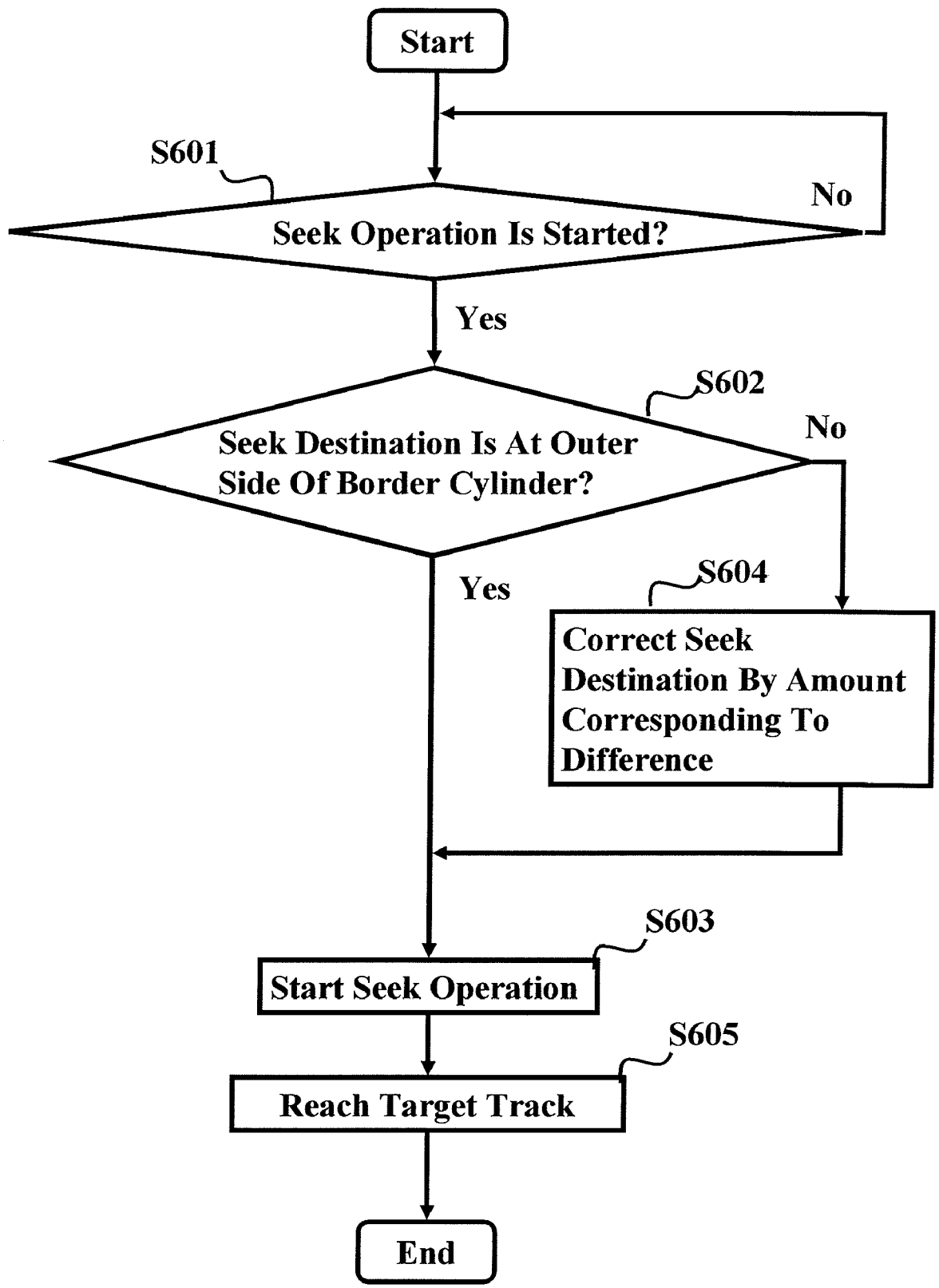
FIG. 9 is a flowchart showing head-position control processing performed by the storage device according to the first embodiment.

Head-position control processing performed by the storage device will now be described with reference to FIG. 9. FIG. 9 is a flowchart showing head-position control processing performed by the storage device according to the first embodiment.

As shown in FIG. 9, when a seek operation is started (affirmative in step S601), a determination is made whether or not a seek destination is at the outer side of a border cylinder (in step S602). When the seek destination is at the outer side of the border cylinder (affirmative in step S602), the storage device 10 continues the seek operation (in step S603) to cause the head 12 to reach a target track (in step S605).

On the other hand, when the seek destination is not at the outer side of the border cylinder, i.e., when the seek destination is at the inner side of the border cylinder (negative in step S602), the storage device 10 corrects the seek destination by an amount corresponding to the difference extracted by the difference extracting module 63 (in step S604). The storage device 10 starts a seek operation (in step S603) to cause the head 12 to reach a target track (in step S605).

More specifically, in the above-described example, when the seek destination is at the outer side of the border cylinder (track 5007), for example, when the seek destination is the track 5000 or the like, the head-position control module 64 in the storage device 10 continues the seek operation (in step S603) to cause the head 12 to reach a target track.

On the other hand, when the seek destination is at the inner side of the border cylinder (track 5007), for example, when the seek destination is track 6010 or the like, the head-position control module 64 in the storage device 10 corrects the seek destination by an amount corresponding to the difference "track 1000.5" extracted by the difference extracting module 63, i.e., corrects the seek destination from the track 6010 to the track 7010.5, to cause the head 12 to reach a target track.

Advantages of First Embodiment

The first embodiment is directed to a configuration including a disk 11 and a head 12 for reading information written to the disk 11. The disk 11 is a disk subjected to first servo writing processing for writing two same pieces of servo information in parallel from an inner cylinder to a predetermined cylinder at the outer side and then subjected to second servo writing processing for writing servo information from an outer cylinder to a predetermined cylinder at the inner side so as to overwrite one of the two pieces of servo information written by the first servo writing processing, so that the servo information is redundantly written at the predetermined cylinder by the first servo writing processing and the second servo writing processing, and a head for reading the information written to the disk. The servo information written by the second servo writing processing is read by the head 12 and predetermined cylinder information is detected from the disk 11, the servo information written by the first servo writing processing and not overwritten by the second servo writing processing is read by the head 12 and predetermined cylinder information is detected from the disk 11, and difference between the cylinder information detected from the inner side and the cylinder information detected from the outer side is extracted. When the head is positioned over a track at the inner side of the predetermined cylinder, servo information obtained by adding the extracted difference to the position of the track is read using the head 12 and the position of the head 12 is controlled in accordance with the read servo information. Thus, even for a storage medium having only one head, it is possible to correctly detect a border cylinder and is possible to prevent deterioration in the quality of the servo information. In addition, the invention allows the use of the disk 11 having high-quality servo information, and thus can contribute to an increase in the number of tracks of the disk 11 per inch.

Moreover, according to the first embodiment, when the extracted difference is a negative value, the disk 11 having cylinder information from which a negative value was detected is rejected. Thus, it is possible to detect a storage medium having a cylinder with double gray codes. As a result, it is possible to eliminate inconveniences (e.g., a track number found from the outer side and a track number found from the inner side being different from each other) that occur when a cylinder with double gray codes exist.

Second Embodiment

In the first embodiment, although a case in which the difference between the normal servo written from the outer side and the double servo written from the inner side is determined from the vicinity of the border to correct the servo information, the invention is not limited thereto. For example, the amount of relative eccentricity that occurs due to writing of servo information from both the outer side and the inner side can be determined to correct the servo information.

Overview of Storage Device of Second Embodiment

Figure 10:
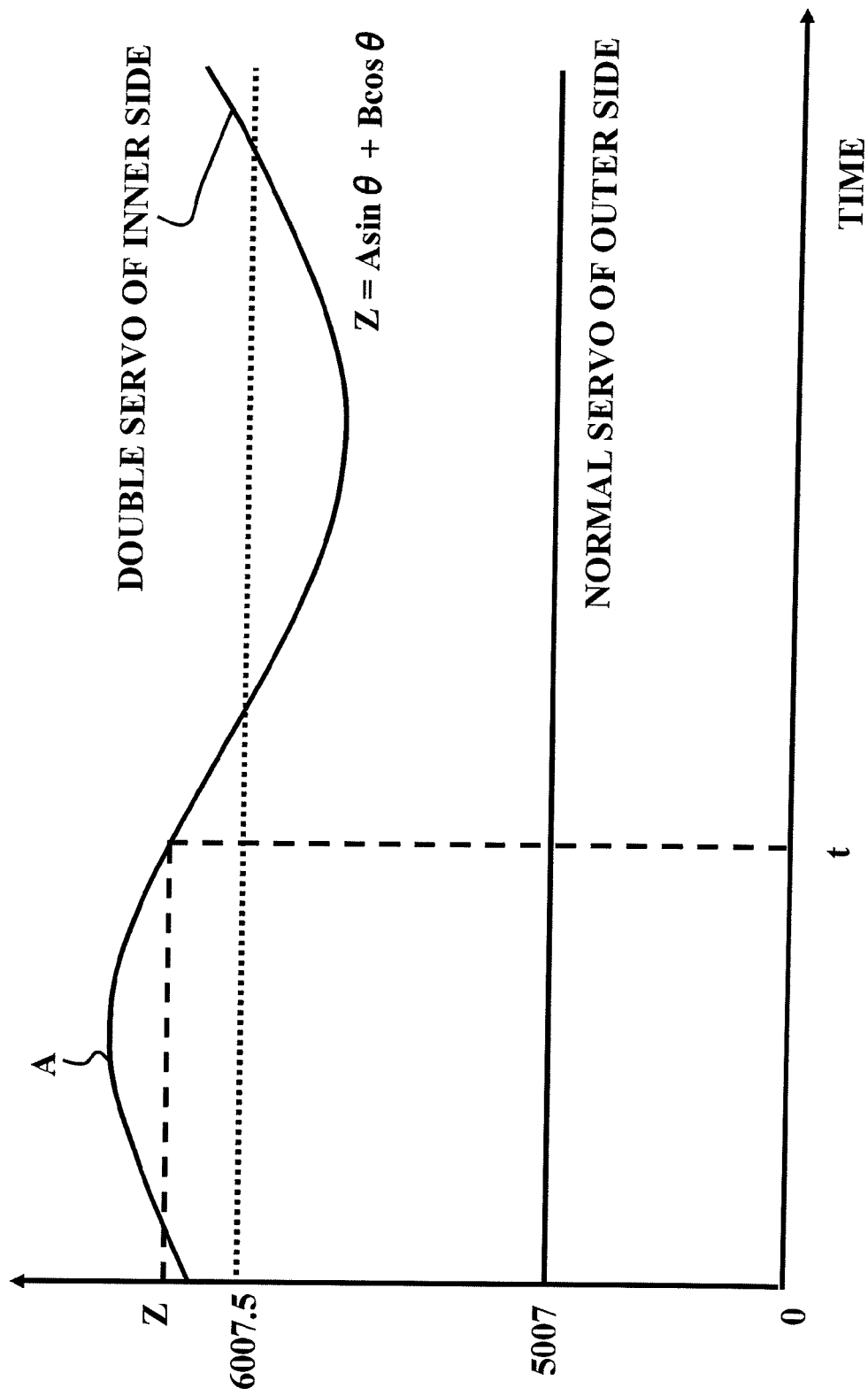
FIG. 10 is a graph illustrating an overview of a storage device according to a second embodiment.

In a second embodiment, a case in which the amount of relative eccentricity is further determined and the servo information is corrected will be described with reference to FIGS. 7 to 9. FIG. 10 is a graph illustrating an overview of the storage device according to the second embodiment.

First, the amount of relative eccentricity will be described. When bidirectional servo-track writing is performed to write servo information, the servo information written from the outer side and the servo information written from the inner side have a border therebetween. The border(s) from both sides do not completely match each other and are displaced in the time direction and the radial direction, due to environmental changes during the servo track writing. As a result, non-detection or false detection of the servo information is very likely to occur. Accordingly, as described in the first embodiment, double servo is used to perform border correction on the border vicinity.

When the bidirectional servo track writing is performed, i.e., when servo track writing is performed from both the inner side and the outer side, times of the writing do not match each other at the border portion. Thus, even under a controlled temperature environment, a temperature difference occurs during the writing to the border. This temperature difference causes a slight change in the length of the head arm and causes a variation in the amount of eccentricity. As a result, relative eccentricity occurs. In the presence of relative eccentricity, when the head 12 crosses the border during the seek, a target position and an actual position do not match each other and overcorrection causes the seek current to fluctuate. Thus, correction of the relative eccentricity is important in order for the device to utilize the bidirectional servo track writing.

An example in which the amount of relative eccentricity is further determined and servo information is corrected to control the head 12 will now be described with reference to FIG. 10. As described in the first embodiment, at the border (track 5000), a mismatch occurs between the normal servo (track 5007) written from the outer side and the double servo (track 6007.5) written from the inner side. In addition, the length of the head arm varies due to temperature variations and so on during the writing of the servo information, and relative eccentricity occurs between the normal servo (track 5007) written from the outer side and the double servo (track 6007.5) written from the inner side, as shown in FIG. 10. Thus, the difference between the normal servo written from the outer side and the double servo written from the inner side do not necessarily match the track 1000.5. More specifically, for example, when the double servo is read at time t, the servo information is Z (e.g., track 6007.9), not track 6007.5. That is, even when the same servo information is to be read, the servo information differs depending on time.

Accordingly, the storage device 10 measures cylinder information in each servo frame of the normal servo at the border cylinder and each servo frame of the double servo thereat, performs DFT (discrete Fourier transform) on the measured values to obtain Sin components and Cos components, and determines the amount of relative eccentricity therefrom to control the head 12 by correcting the cylinder information by an amount corresponding to the determined amount of relative eccentricity.

More specifically, for example, by using the head 12 to read the normal servo written at the outer side, the outer-side border detection module 61 in the storage device 10 detects the gray code "track 5007" at the border cylinder of the disk 11. Subsequently, by using the head 12 to read the double servo written at the inner side, the inner-side border detection module 62 in the storage device 10 detects a gray code at the border on the disk 11. The difference extracting module 63 then determines a difference between the cylinder information read by the outer-side border detection module 61 and the cylinder information read by the inner-side border detection module 62. The storage device 10 performs the above-described series of processing (i.e., the processing for causing the outer-side border detection module 61 to detect the normal servo, causing the inner-side border detection module 62 to detect the double servo, and extracting the difference therebetween) with respect to each entire track in the border vicinity (i.e., the track 5007 at the outer side and the track 6007.5 at the inner side).

By performing the above-described processing on each entire track in the border vicinity, the difference extracting module 63 in the storage device 10 can extract a one-track difference (Pos(x): x=0, 1, 2, 3, . . . ) associated with the detection time. Thus, the difference extracting module 63 performs frequency analysis (DFT) on the obtained one-track difference to determine a function "Z=Asin θ+Bcos θ", which represents the servo information (indicated by solid line (A) in FIG. 10) that involves relative eccentricity. The storage device 10 stores, out of the determined function, only A and B which indicate variables unique to the storage device. There is no need to store θ, since typical position information stored the storage device is used therefor.

Thereafter, when the head 12 crosses the border, i.e., when the head 12 reads the servo information at the inner side of the border, the head-position control module 64 in the storage device 10 determines the amount of relative eccentricity from the determined function "Z=Asin θ+Bcos θ" and corrects the servo information by an amount corresponding to the determined relative eccentricity to control the position of the head 12. For example, when the head 12 is positioned over the servo-information track 5010 at the inner side of the border, the head-position control module 64 determines the amount of relative eccentricity "1000.8" from the determined function "Z=Asin θ+Bcos θ" and controls the position of the head 12 by using the servo information "track 6010" corrected by an amount corresponding to the determined amount of relative eccentricity. In this manner, determining the amount of relative eccentricity and correcting the servo information by an amount corresponding thereto allows the position of head 12 to be controlled with higher accuracy.

Flow of Processing (Second Embodiment)

Figure 11:
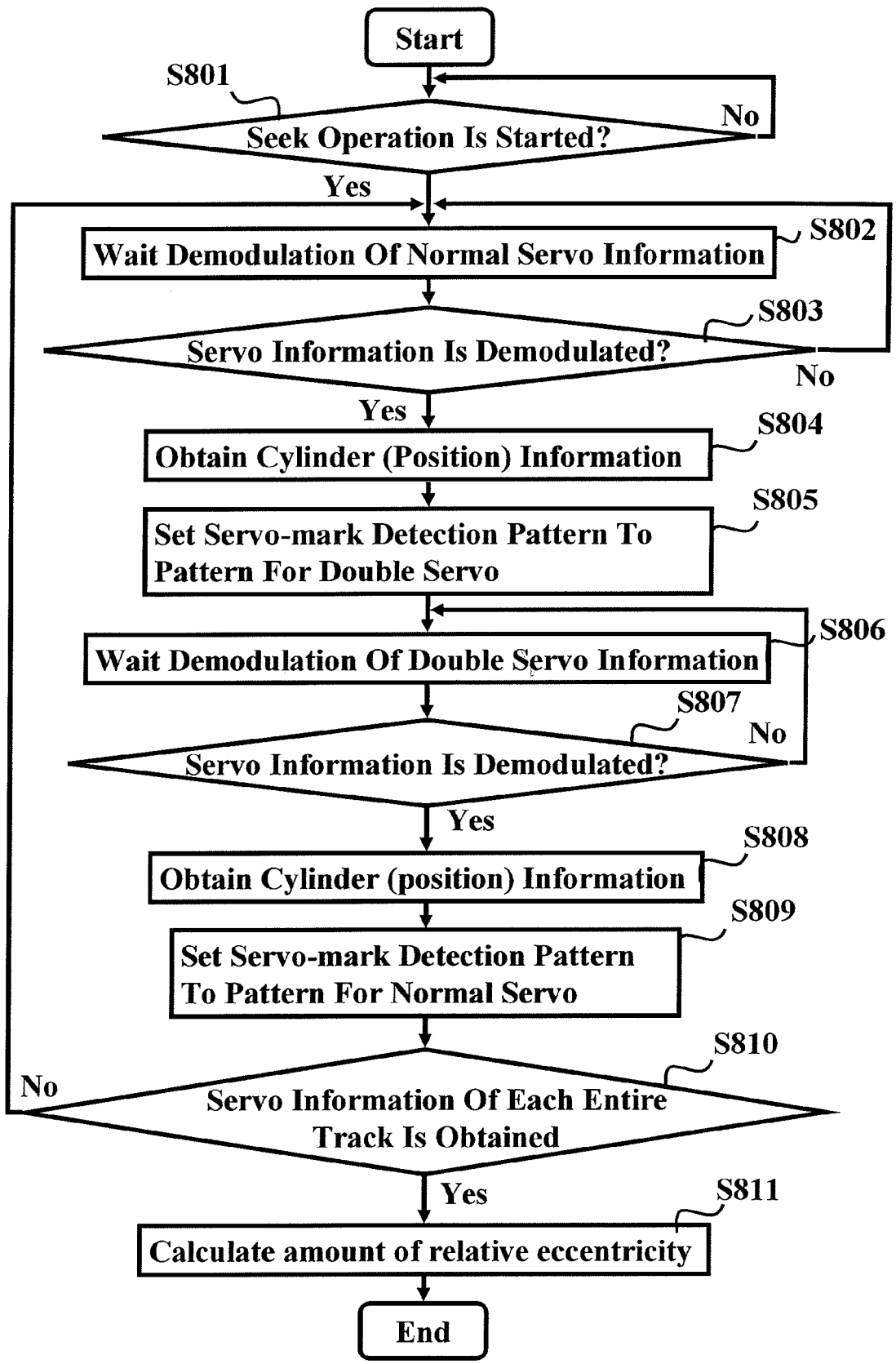
FIG. 11 is a flowchart showing relative-eccentricity-amount determination processing performed by the storage device according to the second embodiment.
Figure 12:
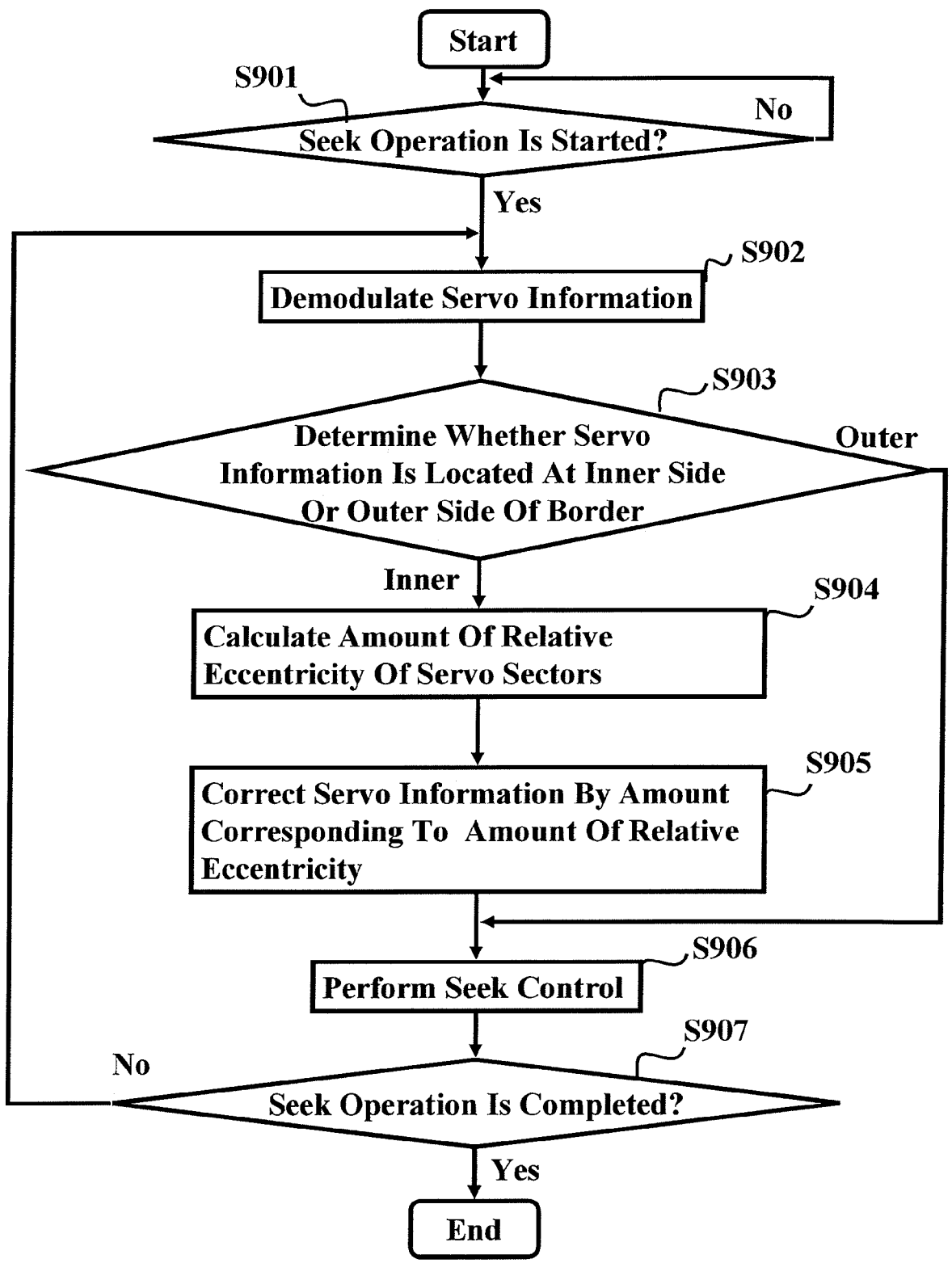
FIG. 12 is a flowchart showing head-position control processing performed by the storage device according to the second embodiment.

A flow of processing according to the second embodiment will now be described with reference to FIGS. 8 and 9. FIG. 11 is a flowchart showing relative-eccentricity-amount determination processing performed by the storage device according to the second embodiment. FIG. 12 is a flowchart showing head-position control processing performed by the storage device according to the second embodiment.

Flow of Relative-Eccentricity-Amount Determination Processing

As shown in FIG. 11, when an instruction for starting determination of the amount of relative eccentricity in the border vicinity is input from the host computer 100 or the like (affirmative in step S801), the storage device 10 seeks the head 12 to a border cylinder corresponding to the outer-side border (in step S802).

More specifically, for example, when an instruction for starting determination of the amount of relative eccentricity in the border vicinity is input from the host computer 100 or the like, the MCU 60 in the storage device 10 drives the SVC 40 and the VCM 13 to seek the head 12 to a border cylinder corresponding to the outer-side border. An administrator or the like pre-sets, in the MCU 60, information for the outer-side border. Upon receiving the storage medium and receiving the border-cylinder detection start instruction, the storage device 10 can seek the head 12 to a border cylinder by using the MCU 60.

When the servo information at the border cylinder is read by the head 12 and is completely demodulated (affirmative in step S803), the storage device 10 obtains cylinder information (i.e., a position) from the read and demodulated servo information (in step S804).

More specifically, for example, when the head 12 is sought to the border cylinder and is positioned over a track, it reads servo information on the track and outputs the read servo information to the RDC 20. The RDC 20 demodulates the input servo information and outputs the demodulated servo information to the MCU 60 via the HDC 50. When the MCU 60 receives the servo information, the outer-side border detection module 61 detects cylinder information (gray code "track 5007") and outputs the cylinder information to the difference extracting module 63.

Subsequently, the storage device 10 sets the servo-mark detection pattern to a pattern for double servo and seeks the head 12 to a border cylinder corresponding to the inner-side border (in step S805). When the servo information at the border cylinder is read by the head 12 and is completely demodulated (affirmative in step S807), the storage device 10 obtains the cylinder information form the read and demodulated servo information (in step S808).

More specifically, for example, when the servo-mark detection pattern is set to a pattern for double servo and the head 12 is sought to a border cylinder corresponding to the inner-side border and is positioned over a track, it reads servo information on the track and outputs the read servo information to the RDC 20. The RDC 20 demodulates the input servo information and outputs the demodulated servo information to the MCU 60 via the HDC 50. When the MCU 60 receives the servo information, the inner-side border detection module 62 detects cylinder information (i.e., gray code "track 6007.7") from the received servo information and outputs the cylinder information to the difference extracting module 63.

Thereafter, the storage device 10 sets the servo-mark detection pattern to a pattern for normal servo (in step S809). Upon receiving servo information of each entire track (affirmative in step S810), the storage device 10 calculates the amount of relative eccentricity (in step S811).

More specifically, for example, when the storage device 10 sets the servo-mark detection pattern to a pattern for normal servo and obtains servo information of each entire track, the difference extracting module 63 extracts a difference "1000.5" obtained by subtracting the border-cylinder information (gray code "track 5007") received from the outer-side border detection module 61 from the border-cylinder information (gray code "track 6007.7") received from the inner-side border detection module 62. By performing the above-described series of processing, the difference extracting module 63 obtains differences "1000.4", "1000.5", "1000.7", "1000.8", . . . "−1000.8", "−1000.7" "−1000.6", "−1000.5", . . . and so on. Based on the obtained differences, the difference extracting module 63 determines the function "Z=Asin θ+Bcos θ", which represents the relative eccentricity.

Flow of Head-Position-Control Processing

Head-position-control processing performed by the storage device according to the second embodiment will now be described with reference to FIG. 12. FIG. 12 is a flowchart showing head-position-control processing performed by the storage device according to the second embodiment.

As shown in FIG. 12, when the storage device 10 starts a seek operation (affirmative in step S901), it demodulates servo information on a track over which the head 12 is positioned (in step S902). The storage device 10 determines whether the servo information (i.e., the position of the head 12) is located at the inner side or outer side of the border (in step S903).

More specifically, for example, the head-position control module 64 in the storage device 10 seeks the head 12, demodulates servo information on a track over which the head 12 is positioned, and determines whether the position of the head 12 is located at the inner side or outer side of the border (the track 5007).

When the position of the head 12 is located at the inner side of the border (affirmative in step S903), the storage device 10 calculates the amount of relative eccentricity of servo sectors (in step S904), corrects the servo information by an amount corresponding to the amount of relative eccentricity (in step S905), and performs seek control (in step S906).

More specifically, for example, when it is determined that the position of the head 12 is over the track 5010 located at the inner side of the border (the track 5007), the storage device 10 calculates a relative eccentricity (e.g., 1000.4) by using the determined function "Z=Asin θ+Bcos θ" and performs seek control by using servo information "6010.4" corrected by an amount corresponding to the amount of relative eccentricity "1000.4".

On the other hand, when the position of the head 12 is located at the outer side of the border (negative in step S903), the storage device 10 performs seek control without the correction (in step S906).

The storage device 10 then determines whether or not the seek operation is completed (in step S907). When the seek operation is completed (affirmative in step S907), the processing ends. When the seek operation is not completed (negative in step S907), the process returns to step S902 and the storage device 10 executes the processing in step S902 and the subsequent steps.

Advantage of Second Embodiment

As described above, according to the second embodiment, in the border vicinity, not only the difference between double servo written from the inner side and normal servo written from the outer side but also the amount of relative eccentricity that occurs as a result of writing the servo information from both the inner side and the outer side are determined. Further, servo information corrected by an amount corresponding to the determined amount of relative eccentricity is used to control the position of the head 12. As a result, it is possible to control the head of the head 12 with higher accuracy.

Figure 13A:
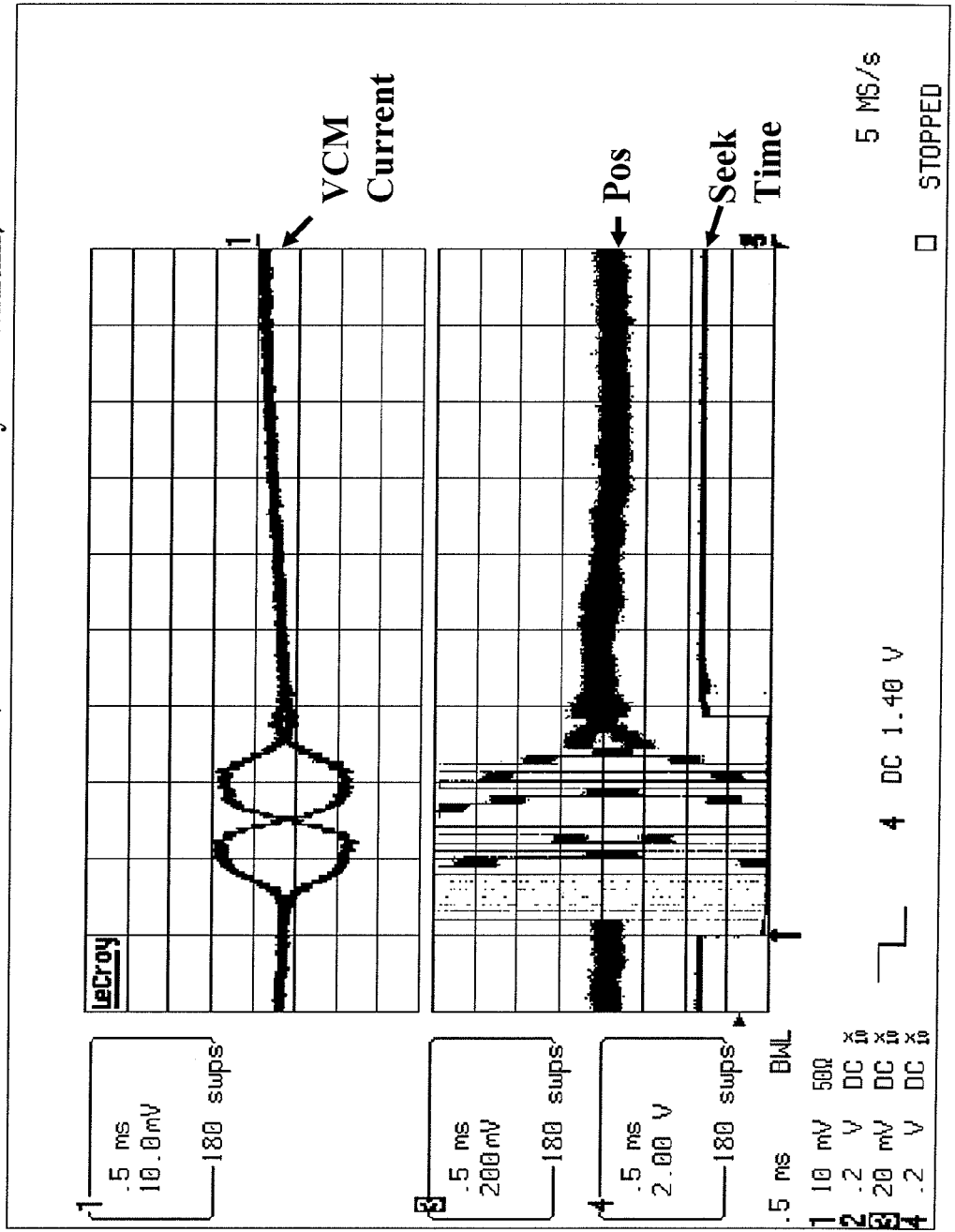
Figure 13C:
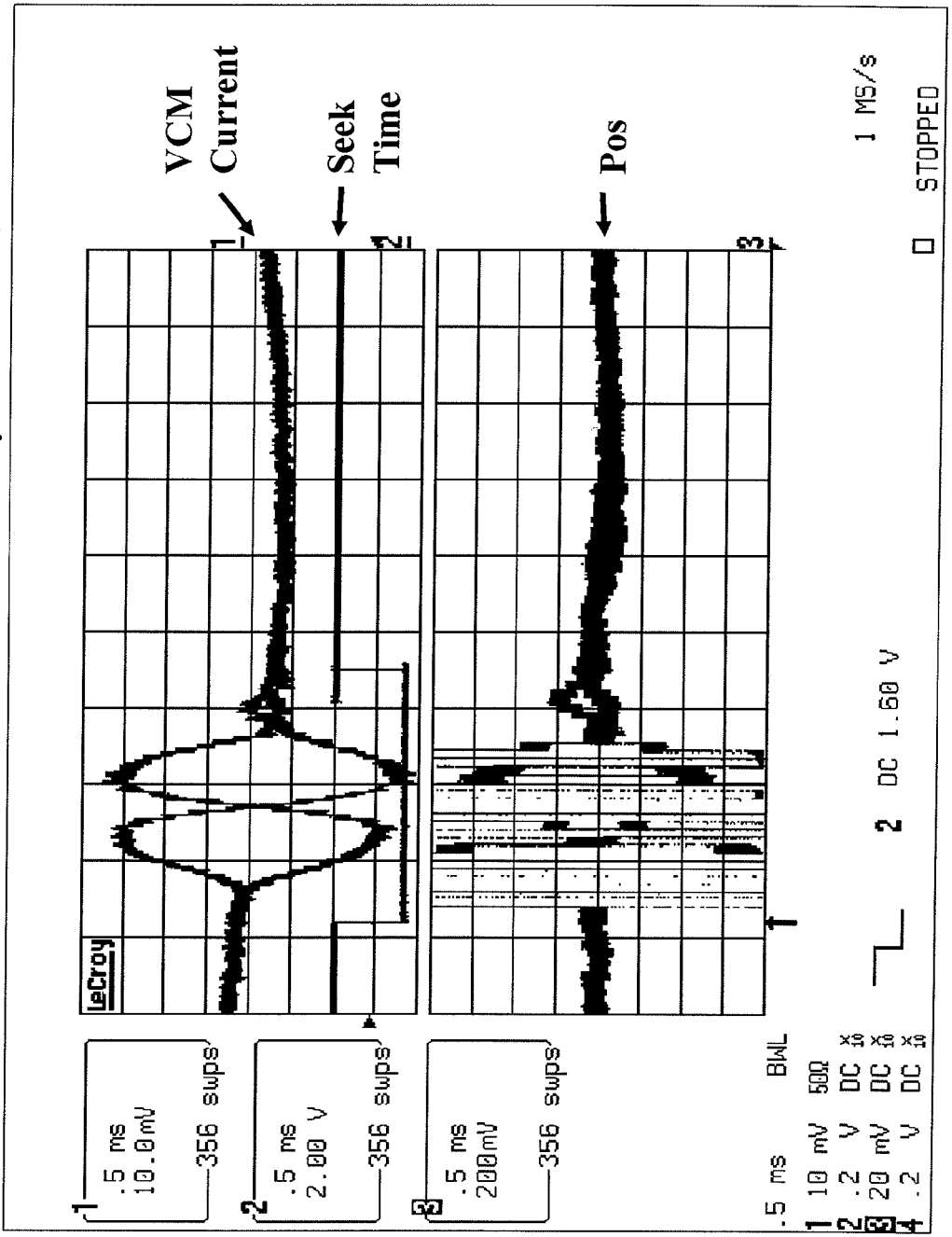

According to the second embodiment, it is possible to prevent flow of abnormal current due to overcorrection during seek of the head 12. For example, as shown in FIG. 13A, FIG. 13B, and FIG. 13C, VCM current and a position (Pos) during the seek across the border in a case FIG. 13C in which the amount of relative eccentricity is corrected are more stable than those in a case FIG. 13A, FIG. 13B in which the amount of relative eccentricity is not corrected. In particular, at a cylinder where the relative eccentricity is a maximum, the VCM current and the position (Pos) in the case FIG. 13C in which the amount of relative eccentricity is corrected are more stable. That is, it is possible to prevent flow of abnormal current due to overcorrection during seek of the head 12. FIG. 13 illustrates examples of abnormal current due to overcorrection during the seek.

Although a case in which a difference for each entire track in the vicinity of the border (the track 5007) is obtained to determine the function representing the amount of relative eccentricity has been described in the second embodiment, the invention is not thereto. For example, some differences on tracks in the vicinity of the border (the track 5007) may be obtained to determine the function representing the amount of relative eccentricity.

Third Embodiment

Although a case in which servo information corrected by an amount corresponding to the determined amount of relative eccentricity is used to control the position of the head 12 has been described in the second embodiment, the invention is not limited thereto. For example, the arrangement may be such that a difference between servo information (a final target position) corrected by an amount corresponding to the determined amount of relative eccentricity and an estimated head position and control is performed so that the head 12 reaches the final target position by gradually correcting the head position by an amount corresponding to the difference.

Overview of Storage Device According to Third Embodiment

In a third embodiment of the invention, a case in which a difference between the actual position of the head 12 and an estimated position thereof is extracted and control is performed so that the position of the head 12 reaches a target position by gradually correcting the head position by an amount corresponding to the difference will now be described with reference to FIGS. 11 and 12. FIG. 14 is a graph illustrating an overview of a storage device according to the third embodiment.

This storage device 10 has a estimating unit, which is typically used for a magnetic disk device or the like, to estimate the position of the head 12 from electrical current supplied thereto. The storage device 10 uses a scheme that is analogous to that of the second embodiment to determine a function "$Z=A\sin\theta+B\cos\theta$", which represents the amount of relative eccentricity of inner-side double servo. The storage device 10 uses the function, in which time components are recalculated into frequency components, to determine the amount of relative eccentricity (e.g., track 6007).

The storage device 10 extracts a difference between the determined amount of relative eccentricity Z (e.g., track 6007) representing the final target position and the head position estimated by the estimation unit, determines a target position by multiplying the difference by a rate (100%) and adding the resulting value to the final target position, and performs position control so that the head 12 reaches the target position by slightly varying the value of current supplied to the head 12. Subsequently, the storage device 10 extracts a difference between the final target position and the head position estimated by the estimation unit, determines a target position by multiplying the difference by a rate (90%) and adding the resulting value to the final target position, and performs position control so that the head reaches the target position by slightly varying the value of current supplied to the head 12. In this manner, by extracting a difference between the final target position and the head position estimated by the estimation unit, determining a target position by multiplying the difference by a rate (100% to 0%) and adding the resulting value to the final target position, and then performs position control step by step so that the head 12 reaches the determined target position, the storage device 10 causes the head 12 to gradually approach the final target position "track 6007".

Processing According to Third Embodiment

Figure 15:
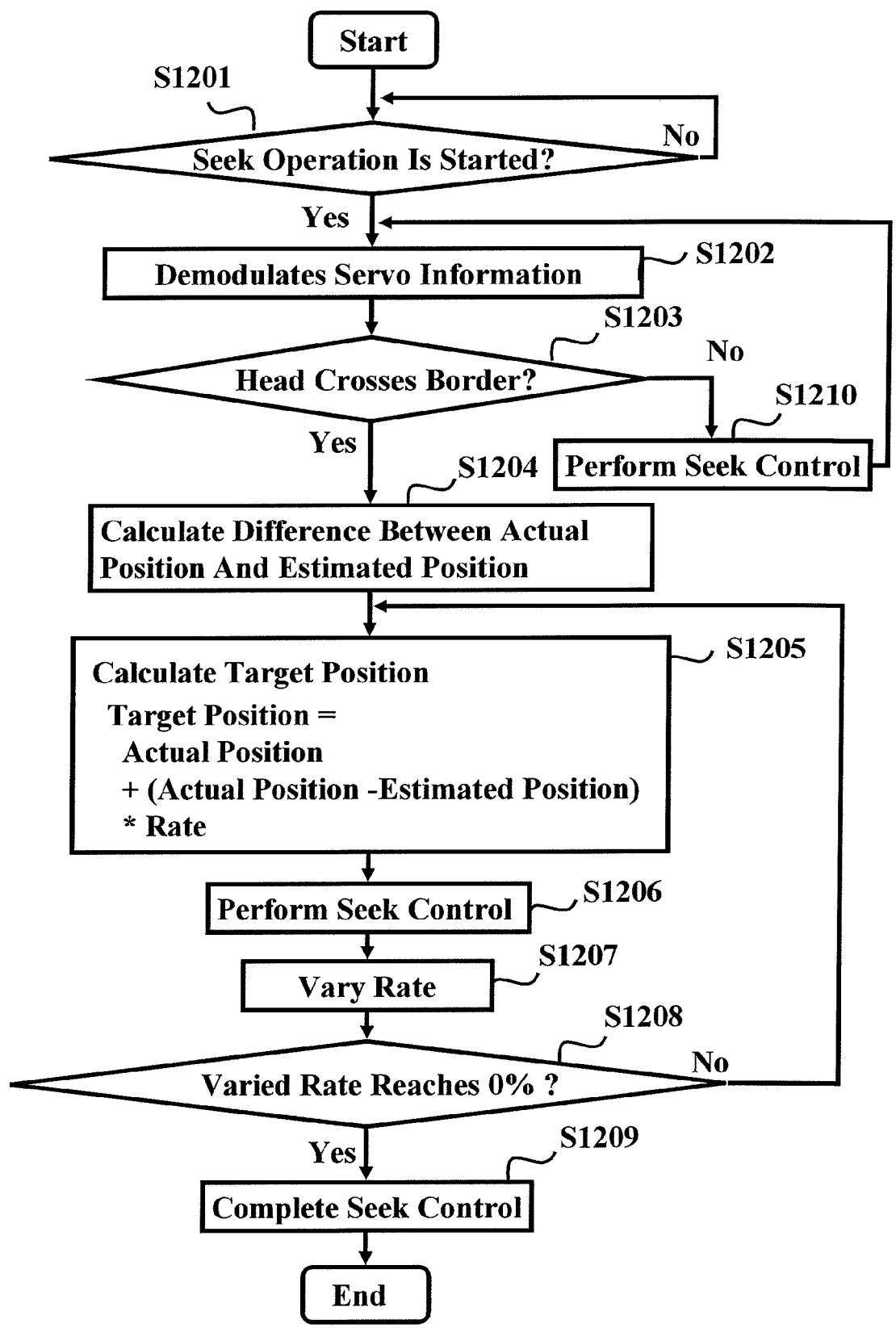
FIG. 15 is a flowchart showing seek processing performed by the storage device according to the third embodiment.

A flow of processing performed by the storage device according to the third embodiment will now be described with reference to FIG. 15. FIG. 15 is a flowchart showing seek processing performed by the storage device according to the third embodiment.

As shown in FIG. 15, upon start of seek control (affirmative in step S1201), the storage device 10 demodulates servo information on a track over which the head 12 is positioned (in step S1202) and determines whether or not the head 12 crosses the border (in step S1203).

More specifically, for example, the head-position control module 64 in the storage device 10 seeks the head 12, demodulates servo information on a track over which the head 12 is positioned, and determines whether or not the position of the head 12 crosses the border (the track 5007).

When the position of the head 12 crosses the border (affirmative in step S1203), the storage device 10 calculates a difference between the actual position and an estimated position (in step S1204).

More specifically, for example, when the position of the track 12 crosses the border (the track 5007), the difference extracting module 63 in the storage device 10 determines the amount of relative eccentricity Z (e.g., track 6007) representing the final target position, and extracts a difference between the determined final target position and a head position estimated by the estimation unit. The storage device 10 then sends a notification indicating the difference to the head-position control module 64.

Thereafter, the storage device 10 calculates a target position (in step S1205), performs seek control so that the head 12 reaches the calculated target position (in step S1206), and varies the rate used for determining the target position (in step S1207). Until the varied rate reaches 0% (negative in step S1208), the process returns to step S1205 and the storage device 10 calculates a target position to perform seek control of the head 12.

More specifically, for example, the head-position control module 64 in the storage device 10 controls the head 12 so that it reaches a target position obtained by multiplying the difference received from the difference extracting module 63 by the rate (100%) and adding the resulting value to the final target position. Thereafter, the head-position control module 64 extracts a difference between the final target position and a head position estimated by the estimation unit, determines a target position by multiplying the difference by the rate (100% to 0%) and adding the resulting value to the final destination position, and controls the position of the head 12 step by step so that it reaches the target position by slightly varying the value of current supplied to the head 12. By doing so, the storage device 10 causes the head 12 to gradually approach the final target position "the track 6007". The administrator or the like can arbitrary set at what percentage the rate is to be varied.

When the varied rate reaches 0% (affirmative in step S1208), i.e., when the head 12 reaches the final target position, the head-position control module 64 ends the seek control (in step S1209).

Referring back to step S1203, when the head 12 does not cross the border (negative in step S1203), the storage device 10 performs seek control (in step S1210) and repeats the processing in step S1202 and the subsequent step.

Advantage of Third Embodiment

As described above, according to the third embodiment, the amount of relative eccentricity is determined, a difference between servo information (the final target position) corrected by an amount corresponding to the determined amount of relative eccentricity and an estimated head position, and control is performed so that the head 12 reaches the final target position by gradually correcting the head position by an amount corresponding to the difference. As a result, it is possible to reliably prevent flow of abnormal current due to overcorrection during the operation of the head 12.

Fourth Embodiment

In the invention, when the control operation is changed from coerce control for performing seek control across multiple tracks to fine control for performing seek control on a specific position during border-crossing of the head 12, it is also possible to gradually control the head 12 step by step so that it reaches the target position.

Figure 16:
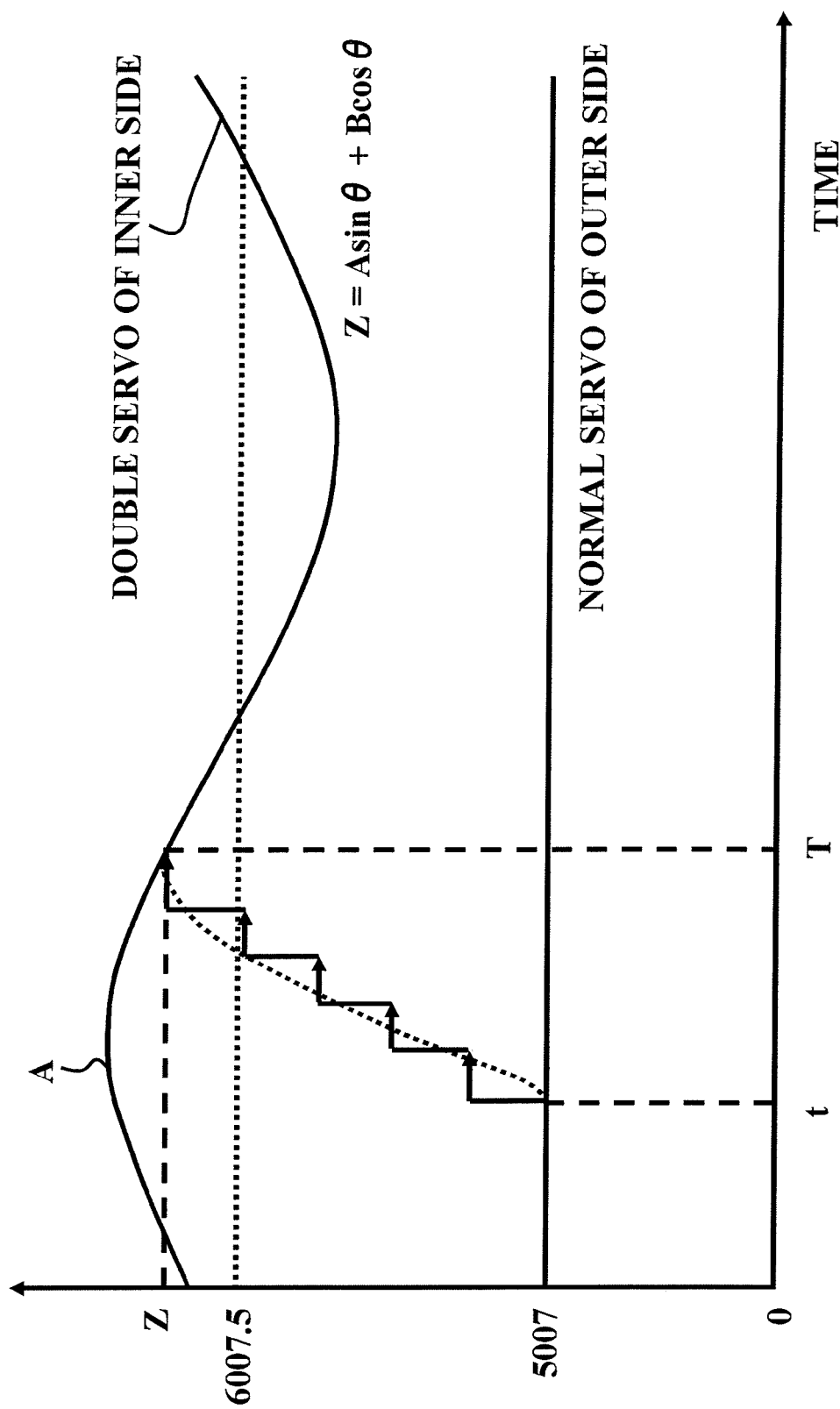
FIG. 16 is a graph illustrating an example for gradually controlling a head step by step when the control operation is changed from coarse control to fine control during the border-crossing of the head.

More specifically, for example, as shown in FIG. 16, when the control operation is changed from the coerce control for performing seek control across multiple tracks to the fine control for performing seek control on a specific position during border-crossing of the head 12, it is possible to perform control step by step so that the head 12 reaches the target position. FIG. 16 is a graph illustrating an example for gradually controlling the head 12 step by step when the control operation is changed from the coarse control to the fine control during the border-crossing of the head 12.

For example, a case using the estimation unit described in the third embodiment will be described by way of example. In this case, it is assumed that the multiplication rates are 80%, 60%, 40%, 20%, and 0% and the amount of time in which the head 12 is moved in flush with the target position is 0.2 ms.

In this case, when the storage device 10 extracts a difference between the determined amount of relative eccentricity Z (e.g., track 6007) representing the final target position and a head position estimated by the estimation unit, determines a target position by multiplying the difference by the rate (80%) and adding the resulting value to the final target position, controls the position of the head 12 so that it reaches the target position by slightly varying the value of current supplied to the head 12, and maintains the same position for 0.2 ms.

Thereafter, the storage device 10 extracts a difference between the determined final target position Z and the head position estimated by the estimation units, determines a target position by multiplying the difference by the rate (60%) and adding the resulting value to the final target position, controls the position of the head 12 so that it reaches the target position, and maintains the same position for 0.2 ms.

The above-described processing is repeated until the rate reaches 0%. That is, the storage device 10 extracts a difference between the determined amount of relative eccentricity Z (e.g., track 6007) representing the final target position and the head position estimated by the estimation unit, controls the head 12 so that it reaches the position obtained by multiplying the difference by the rate and adding the resulting value to the final target position, and maintains the head position for a specified amount of time. By doing so, it is possible to allow position of the head 12 to gradually approach the amount of relative eccentricity Z (e.g., track 6007) representing the final target position. As a result, even for the fine control that requires slightly varying the value of current supplied to the head 12 in order to finely control the position of the head 12, it is possible to reliably prevent flow of abnormal current due to overcorrection during the seek of the head 12.

Fifth Embodiment

While some embodiments of the invention have been descried above, the invention may be carried out in various different forms other than the above-described embodiments.

Another embodiment will now be described in connection with (1) Detection of Amount of Time Difference, (2) Double Servo using Special Mark Pattern, (3) Preventing Use of Area in Vicinity of Border, (4) Position of Border, and (5) System Configuration.

(1) Detection of Amount of Time Difference

For example, in the invention, the amount of time difference between the servo information written by the first servo writing processing and the servo information written by the second servo writing processing can also be determined using, of the double servo having two same pieces of servo information written by the first servo writing processing, the servo information not overwritten by the second servo writing processing.

Figure 17:
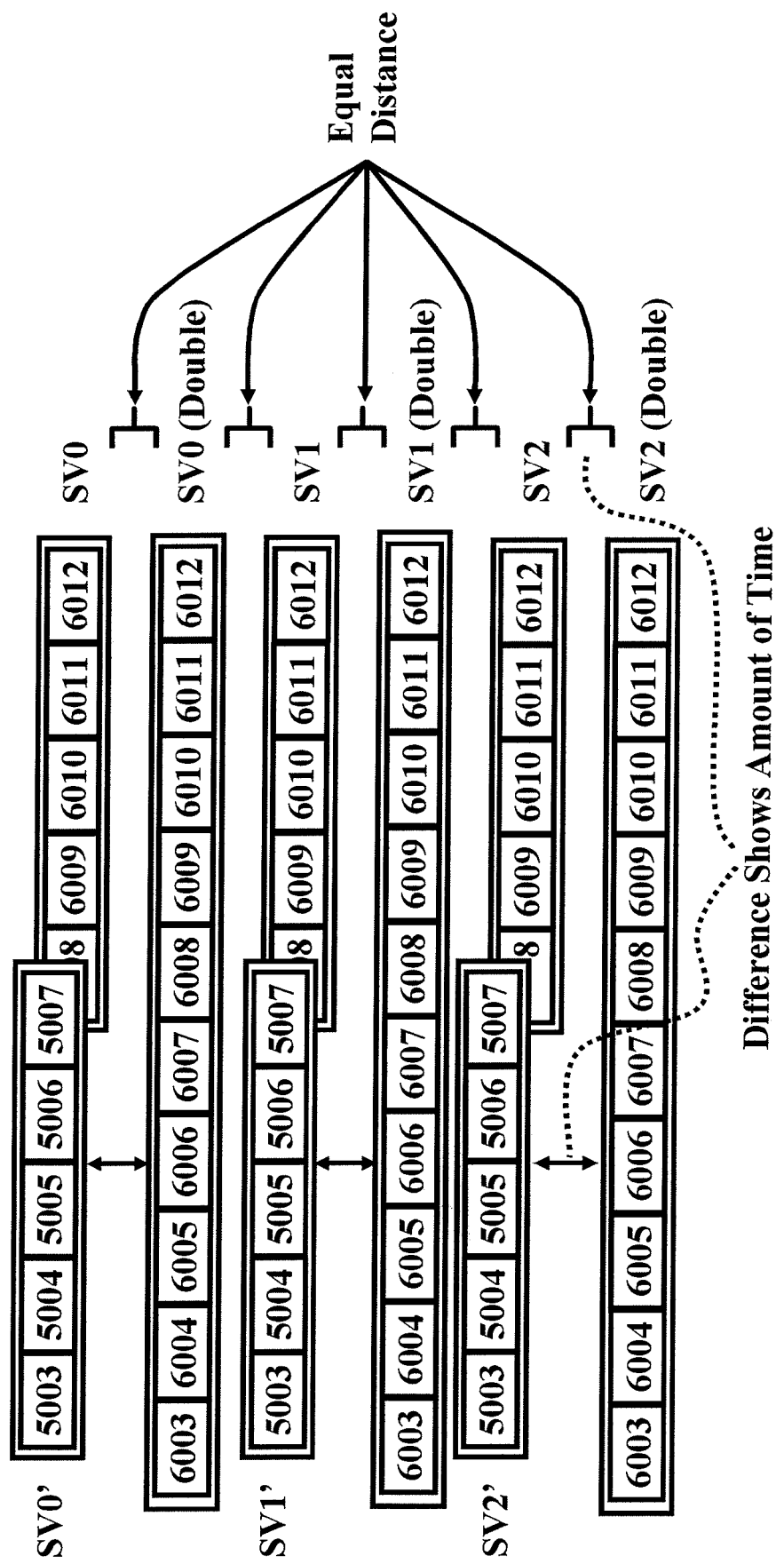
FIG. 17 shows an example of a scheme for determining the amount of time difference.

More specifically, as shown in FIG. 17, SV0 (double) is written between SV0 and SV1, and thus, it means that SV0 (double) is written at half the time of the servo interval. Thus, measurement of time of outer SV0 and time of inner SV0 makes it possible to determine a time difference between SV0 at the inner side and SV0 at the outer side. Measurement of the time difference from both pieces of servo information of each entire track makes it possible to enhance the accuracy. FIG. 17 is a graph showing an example of a scheme for determining the amount of time difference.

(2) Double Servo Using Special Mark Pattern

In the invention, in the first servo writing processing, it is possible to use a disk to which the servo information not overwritten by the first writing processing was written using a special mark pattern. That is, of the double servo having two same pieces of servo information written in parallel by the first servo writing processing, a special mark pattern may be used for the servo information not overwritten by the second servo writing processing.

With this arrangement, since the head-position control module 64 cannot use the servo information written with the special pattern to control the position of the head 12, it is possible to prevent mistakenly using the servo information written as double servo and not overwritten. As a result, even after data is written to the disk, the servo information written as double servo and not overwritten can be maintained in the state in which it was written. Thus, it is possible to correctly detect a border cylinder and also to prevent deterioration in the servo quality.

(3) Preventing Use of Area in Vicinity of Border

In the invention, the position of the head 12 can be controlled so as to skip an area on the disk 11 in the vicinity of a predetermined cylinder (the border) detected by the outer-side border detection module 61, to prevent the area from being used as a user area. More specifically, for example, the head-position control module 64 registers, as an unavailable area, two tracks (i.e., a previous track and a subsequent track) across the track 5007, detected by the outer-side border detection module 61 in a disk management area so that the registered area is subjected to skip control, and controls the position of the head 12 so as to prevent the registered area from being used as a user area.

With this arrangement, it is possible to prevent data from being written to the border cylinder. Consequently, even after data is written to the disk 11, the servo information written in the border vicinity can be maintained in the state in which it was written.

(4) Position of Border

In the invention, it is also possible to use a disk 11 in which a predetermined border cylinder is provided in the vicinity of an area having a yaw angle of 0°. More specifically, it is possible to use a disk 11 that was subjected to first servo writing processing for writing two same pieces of servo information in parallel from an inner cylinder toward an outer-side cylinder in the vicinity of an area having a yaw angle of 0° and was then subjected to second servo writing processing for writing servo information from an outer cylinder toward an inner-side cylinder in the vicinity of the area having a yaw angle of 0° so as to overwrite one of the two pieces of servo information written by the first servo writing processing. That is, in this disk 11, the servo information is redundantly written at the cylinders in the vicinity of the area having a yaw angle of 0°.

With such a disk 11, for cylinders having a yaw angles other than 0°, a read/write gap is increased and the area to be prevented from being used becomes large. However, for a cylinder at a yaw angle of 0°, a wasteful track does not exist, since read and write are performed on the same cylinder. As a result, it is possible to prevent unstable head positioning caused by servo-mark detection error or false detection, gray-code false detection, and burst-information false detection which occur when a read core exists at the border portion.

(5) System Configuration, Etc.

The elements of the illustrated device are merely functional conceptions, and do not necessarily have to be physically configured as illustrated. Although a scheme for realizing the embodiments by using a firmware program for the CPU has been described, the invention is not limited thereto. Thus, the invention is similarly applicable to a scheme for realizing the embodiments with other configurations. That is, the distribution/integration of the units is not limited to the specific configuration (e.g., FIG. 6), and all or some of the units can be arbitrarily distributed/integrated in accordance with loads, the use state, and so on. For example, the outer-side border detection module 61 and the inner-side border detection module 62 may be integrated together. In addition, all or some of the processing functions of the units can be realized by the MCU (or a processing unit, such as a CPU or MPU) and a program analyzed and executed thereby or may be realized by wired-logic-based hardware.

The head-position control method described in the above embodiments can be realized and executed by the MCU in the disk device for a computer, and a program or programs therefor can be distributed over networks, such as the Internet. The program may be recorded to computer-readable storage medium, such as a hard disk, flexible disk (FD), CD-ROM, magneto-optical (MO) disk, or DVD, so as to be read and executed by a computer.

The embodiments have been made to overcome the above-described problems of the related technology, and an object of the embodiments are to provide a storage device, a servo-information writing method, a seek control method, and a control circuit which correctly detect a border track even on a storage medium having only one head and which can prevent deterioration in the quality of servo information.

In order to overcome the above-described problems and to achieve the foregoing object, the embodiments provide a configuration that includes a storage medium that was subjected to first servo writing processing for writing two same pieces of servo information in parallel to a vicinity area including a predetermined cylinder and second servo writing processing for writing servo information so as to overwrite one of the two pieces of servo information written by the first servo writing processing, the servo information being redundantly written at the predetermined cylinder by the first servo writing processing and the second servo writing processing; a head for reading the information written to the storage medium; a first border detection module for causing the head to read the servo information written by the second servo writing processing and detecting cylinder information of the predetermined cylinder; and a second border detection module for causing the head to read the servo information written by the first servo writing processing and not overwritten by the second servo writing processing and detecting cylinder information of the predetermined cylinder. The storage device further includes a difference extracting module for extracting a difference between the cylinder information detected by the first border detection module and the cylinder information detected by the second border detection module; and a head-position control module for causing the head to read, when the head is moved across the predetermined cylinder to which the servo information was written by the first servo writing processing and the predetermined cylinder to which the servo information was written by the second servo writing processing and is positioned over a track, servo information obtained by adding the difference extracted by the difference extracting module to a position of the track or subtracting the difference from the position of the track and for controlling a position of the head by using the read servo information.

In the embodiments, the storage device may further include a reject module for outputting a notification indicating that the storage medium has cylinder information from which a negative value was detected, when the difference extracted by the difference extracting module is a negative value.

In the embodiments, the storage medium may be a storage medium to which the servo information not overwritten by the second servo writing processing was written using a special mark pattern in the first servo writing processing. In this case, the head-position control module does not use the servo information written using the special mark pattern to control the position of the head.

In the embodiments, the head-position control module may control the position of the head so that the head skips an area in the vicinity of the predetermined cylinder detected by the outer-side border detection module and so that the area is prevented from being used as a user area.

In the embodiments, first servo writing processing is performed to write two same pieces of servo information in parallel to a vicinity area including a predetermined cylinder, and second servo writing processing is performed to write servo information so as to overwrite one of the two pieces of servo information written by the first servo writing processing, so that the servo information is redundantly written at the predetermined cylinder by the first servo writing processing and the second servo writing processing.

In the embodiments, the difference extracting module may extract the difference between the cylinder information detected by the first border detection module and the cylinder information detected by the second border detection module, with respect to multiple portions of the storage medium.

In the embodiments, the difference extracting module may extract the difference between the cylinder information detected by the first border detection module and the cylinder information detected by the second border detection module, by causing the head to read the cylinder information in the servo information written by the first servo writing processing and not overwritten by the second servo writing processing while searching for predetermined cylinder information in the servo information written by the second servo writing processing.

The embodiments further provides a seek control method for a storage device including a storage medium that was subjected to first servo writing processing for writing two same pieces of servo information in parallel to a vicinity area including a predetermined cylinder and second servo writing processing for writing servo information so as to overwrite one of the two pieces of servo information written by the first servo writing processing, the servo information being redundantly written at the predetermined cylinder by the first servo writing processing and the second servo writing processing, and a head for reading the information written to the storage medium. The seek control method includes a first border detecting step of causing the head to read the servo information written by the second servo writing processing and detecting cylinder information of the predetermined cylinder; a second border detecting step of causing the head to read the servo information written by the first servo writing processing and not overwritten by the second servo writing processing and detecting cylinder information of the predetermined cylinder; and a difference extracting step of extracting a difference between the cylinder information detected in the first border detection step and the cylinder information detected in the second border detection step. When the head is moved across the predetermined cylinder to which the servo information was written by the first servo writing processing and the predetermined cylinder to which the servo information was written by the second servo writing processing and is positioned over a track, the head is used to read servo information obtained by adding the difference extracted in the difference extracting step to a position of the track or subtracting the difference from the position of the track and the head is sought to a target position by using the read servo information.

In the embodiments, the storage device may further include an actuator for supporting the head and a voice coil motor for seeking the actuator by supplying electrical current thereto. When a target position and a present position of the head do not match each other during the seek, the storage device slightly varies a value of the electrical current.

In the embodiments, a position error may be calculated based on the target position and the present position. In this case, upon detecting that the head reaches the vicinity of the target position, control is switched to following control and the following control is executed.

The embodiments further provides a control circuit for seeking a head, over a storage medium, for reading information written to the storage medium that was subjected to first servo writing processing for writing two same pieces of servo information in parallel to a vicinity area including a predetermined cylinder and second servo writing processing for writing servo information so as to overwrite one of the two pieces of servo information written by the first servo writing processing, the servo information being redundantly written at the predetermined cylinder by the first servo writing processing and the second servo writing processing. The control circuit includes a first border detection module for causing the head to read the servo information written by the second servo writing processing and detecting cylinder information of the predetermined cylinder; a second border detection module for causing the head to read the servo information written by the first servo writing processing and not overwritten by the second servo writing processing and detecting cylinder information of the predetermined cylinder; a difference extracting module for extracting a difference between the cylinder information detected by the first border detection module and the cylinder information detected by the second border detection module; and a head-position control module for causing the head to read, when the head is moved across the predetermined cylinder to which the servo information was written by the first servo writing processing and the predetermined cylinder to which the servo information was written by the second servo writing processing and is positioned over a track, servo information obtained by adding the difference extracted by the difference extracting module to a position of the track or subtracting the difference from the position of the track and for controlling a position of the head by using the read servo information.

According to the embodiments, even for a storage medium having only one head, it is possible to correctly detect a border cylinder and is possible to prevent deterioration in the quality of servo information. In addition, the embodiments allows the use of a storage medium having high-quality servo information, and thus can contribute to an increase in the number of tracks of the storage medium per inch.

As described above, the storage device, the servo information writing method, the seek control method, and the control circuit according to the embodiments are advantageously used to control the position of the head for writing/reading data through demodulation of servo information, with respect to a storage medium having a border between servo information written from the inner side and servo information written from the outer side. In particular, even for a storage medium having only one head, the storage device, the servo information writing method, the seek control method, and the control circuit are suitable for correct detection of a border cylinder and prevention of deterioration in the quality of servo information.

What is claimed is:

1. An apparatus that controls a head position using sector servo, the apparatus comprising:
   a medium having an inner and an outer edges and including first and second servo regions extending radially on the medium, and containing first and second servo information written bidirectionally in radially inward and radially outward directions thereon, respectively, the first servo region extending outwardly from the inner edge to cover a plurality of tracks, the first servo information including track information of the tracks contained in the first servo region, the second servo region extending inwardly from the outer edge to cover a plurality of tracks, the second servo information including track information of the tracks contained in the second servo region, the first and second servo regions overlapping across a circular boundary; and
   a processor executing a process to control track position of a head,
   the process comprising adjusting relation of the first and second servo information across the boundary based on the first and second servo information read by the head to control the track position of the head across the boundary.

2. The apparatus according to claim 1, wherein the process further comprises, tracking a position of track at an edge of the first servo region on the medium, reading out a track number of the second servo information corresponding to the position, calculating a difference of a track number between the track number of the first servo information and the track number of the second servo information.

3. The apparatus according to claim 1, wherein the process further comprises, sending an information of the medium having the difference indicative of negative value.

4. The apparatus according to claim 1, wherein the medium has the one of the first servo information having a special pattern, and the process further comprises, controlling the position of the head by using another of the first servo information having a special pattern.

5. The apparatus according to claim 1, wherein the process further comprises, storing user data into an area outside of and adjacent to the second track.

6. The apparatus according to claim 1, wherein the medium is written onto such that the first servo information and the second servo information overlap in the vicinity of where a yaw angle between a direction of the head and a direction of the circumference in the medium becomes 0 degrees.

7. The apparatus according to claim 1, wherein
the first servo information written in the radially outward direction is twice the second servo information written in the radially inward direction, and
the process further comprises detecting a half portion of the first servo information not overlapping with the second servo information.

8. A method for controlling a disk drive apparatus that controls a head position using sector servo, the disk drive apparatus having a medium written with a plurality of first servo information of the number of predetermined tracks from one of the edges of radial direction and second servo information of the number of predetermined tracks from another of the edge to second track, the second servo information overlapping with a part of the first servo information, a head for reading out the first servo information and the second servo information on the medium, and a detecting module for moving the head to a position of the second track on the medium, reading out track number of first servo information of the position corresponding to the second track, and calculating a difference between the track number of first servo information and the second track number, the method comprising the steps of:
writing the first servo information and the second servo information bidirectionally in radially inward and radially outward directions;
tracking the head to one of the first servo information and the second servo information; and
seeking a position of the head by using the difference upon moving the head across the second track.

9. The method according to claim 8, wherein the head reads the track number of one of the first servo information upon tracking the second servo information of predetermined track number, further comprising, extracting a difference between the track number of one of the first servo information and the predetermined track number.

10. The method according to claim 8, the apparatus further includes an actuator for supporting the head and a voice coil motor for seeking the actuator by supplying electrical current; wherein changing a value of the electrical current when a target position and a present position of the head have a difference from each other during the seek.

11. The method according to claim 8, further comprising, calculating a position error on the basis of the target position and the present position in order to control the head, switching control mode to a following control upon detecting that the head reaches adjacent to the target position, and executing the following control.

12. A control circuit for controlling an apparatus that controls a head position using sector servo, the apparatus having a medium written with a plurality of first servo information of the number of predetermined tracks from one of the edges of radial direction to a first track and second servo information of the number of predetermined tracks from another of the edges to a second track, the second servo information overlapping with a part of the first servo information, and a head for reading out the first servo information and the second servo information on the medium, comprising:
a detecting module for moving the head to a position of the second track on the medium, reading out a track number of first servo information of the position corresponding to the second track, and calculating a difference between the track number of first servo information and the second track number, wherein the first and second servo information are written bidirectionally in radially inward and radially outward directions, the first and second servo regions overlapping across a boundary; and
a processor for controlling position of the head by using the difference upon moving the head across the second track.

13. The control circuit according to claim 12, wherein the head reads the track number of one of the first servo information upon tracking the second servo information of predetermined track number, further comprising, an extracting module for extracting a difference between the track number of one of the first servo information and the predetermined track number.

14. The control circuit according to claim 12, the apparatus further includes an actuator for supporting the head and a voice coil motor for seeking the actuator by supplying electrical current, wherein the processor changes a value of the electrical current when a target position and a present position of the head have a difference from each other during the seek.

* * * * *